(12) United States Patent
Dunn et al.

(10) Patent No.: US 11,050,884 B2
(45) Date of Patent: Jun. 29, 2021

(54) INTENT-DRIVEN CONTACT CENTER

(71) Applicant: LIVEPERSON, INC., New York, NY (US)

(72) Inventors: Matthew Dunn, Arlington, MA (US); Joe Bradley, Seattle, WA (US); Laura Onu, Redmond, WA (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 16/797,779

(22) Filed: Feb. 21, 2020

(65) Prior Publication Data

US 2020/0274969 A1 Aug. 27, 2020

Related U.S. Application Data

(60) Provisional application No. 62/810,146, filed on Feb. 25, 2019.

(51) Int. Cl.
| | |
|---|---|
| *G06F 40/30* | (2020.01) |
| *G10L 15/00* | (2013.01) |
| *G06N 20/00* | (2019.01) |
| *H04M 3/493* | (2006.01) |
| *G06F 16/332* | (2019.01) |
| *G06F 40/35* | (2020.01) |
| *G06F 40/205* | (2020.01) |
| *G10L 15/18* | (2013.01) |
| *H04M 3/523* | (2006.01) |
| *G10L 15/08* | (2006.01) |

(52) U.S. Cl.
CPC ...... *H04M 3/4938* (2013.01); *G06F 16/3329* (2019.01); *G06F 40/205* (2020.01); *G06F 40/35* (2020.01); *G10L 15/1822* (2013.01); *H04M 3/4933* (2013.01); *H04M 3/4936* (2013.01); *H04M 3/5233* (2013.01); *G10L 2015/088* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| | | | |
|---|---|---|---|
| 2012/0296638 A1 | 11/2012 | Patwa et al. | |
| 2015/0227633 A1* | 8/2015 | Shapira | G06F 16/338 707/706 |
| 2015/0279366 A1 | 10/2015 | Krestnikov et al. | |
| 2016/0132291 A1* | 5/2016 | Bai | G06F 3/167 715/728 |

(Continued)

FOREIGN PATENT DOCUMENTS

EP 3 122 001 A1 1/2017

OTHER PUBLICATIONS

International Search Report and Written Opinion for PCT Application No. PCT/US2020/019273 dated May 11, 2020, 12 pages.

*Primary Examiner* — Lamont M Spooner
(74) *Attorney, Agent, or Firm* — Polsinelli LLP

(57) ABSTRACT

The present disclosure relates generally to providing an intent-driven contact center. The contact center according to some embodiments analyzes intents to determine to which device or agent to route a communication. The analyzed intent information can also be used to formulate reports and analyze the accuracy of the identified intents with respect to the received communication.

27 Claims, 28 Drawing Sheets

(56) References Cited

U.S. PATENT DOCUMENTS

| | | | |
|---|---|---|---|
| 2016/0259623 A1* | 9/2016 | Sumner | H04L 67/10 |
| 2016/0260433 A1* | 9/2016 | Sumner | G06F 16/3344 |
| 2018/0239837 A1* | 8/2018 | Wang | G06F 16/90335 |
| 2018/0322403 A1 | 11/2018 | Ron et al. | |
| 2018/0336275 A1* | 11/2018 | Graham | G06F 16/635 |
| 2018/0336894 A1* | 11/2018 | Graham | G10L 15/30 |
| 2019/0012390 A1* | 1/2019 | Nishant | G06N 20/00 |
| 2019/0042988 A1* | 2/2019 | Brown | G06F 9/547 |
| 2019/0102078 A1* | 4/2019 | Bhatt | G06F 3/04847 |
| 2019/0103095 A1* | 4/2019 | Singaraju | G06N 20/10 |
| 2019/0197053 A1* | 6/2019 | Graham | G10L 15/1815 |
| 2019/0206411 A1* | 7/2019 | Li | G10L 15/26 |
| 2019/0258461 A1* | 8/2019 | Li | G06F 40/211 |
| 2019/0281878 A1* | 9/2019 | Tang | G16H 50/30 |
| 2019/0295542 A1* | 9/2019 | Huang | G06F 3/167 |
| 2019/0371315 A1* | 12/2019 | Newendorp | G10L 15/30 |

* cited by examiner

INTENT-DRIVEN CONTACT CENTER

CROSS-REFERENCE TO RELATED APPLICATIONS

This application claims the benefit of U.S. Provisional Patent Application No. 62/810,146, filed Feb. 25, 2019, which is hereby incorporated by reference in its entirety.

FIELD

The present disclosure relates generally to communication processing using artificial-intelligence (AI). More specifically, techniques are provided to deploy an AI platform to select and manage terminal devices in a communication channel, which enables customers to engage with agents best suited to answer natural language queries.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

According to some embodiments, a computer-implemented method is provided. The computer-implemented method comprises receiving a communication. The communication includes one or more words in a natural language. The method further comprises parsing the communication to identify an operative word. This operative word is related to an available action associated with a user device. The method further comprises identifying a pre-defined intent associated with the operative word and facilitating annotation of the pre-defined intent. The pre-defined intent defines the action associated with the user device. Additionally, the annotation defines a quality of an association between the communication and the pre-defined intent. The method further comprises retrieving one or more agent profiles, wherein agent profiles are associated with an agent and a terminal device. Further, the method comprises selecting an agent profile from the one or more agent profiles. The agent profile is selected based on a correlation of the agent profile to the pre-defined intent and the quality of the association between the communication and the pre-defined intent. The method further comprises routing the communication, wherein when the communication is received at the terminal device associated with the selected agent profile, execution of the action is facilitated.

In some embodiments, identifying the operative word includes querying a database including at least the operative word, wherein the querying is performed using the one or more words as input.

In some embodiments, the pre-defined intent associated with the operative word is identified through a query of a database including associations between stored operative words and intents.

In some embodiments, the annotation is performed based on a correlation of the communication and the pre-defined intent.

In some embodiments, the correlation of the agent profile to the pre-defined intent indicates that the pre-defined intent matches an intent of which an agent associated with the agent profile is knowledgeable.

In some embodiments, the execution of the action includes facilitating a connection between the user device and the terminal device.

In one embodiment, a system comprises one or more processors and memory including instructions that, as a result of being executed by the one or more processors, cause the system to: receive a communication, wherein the communication includes one or more words in a natural language; identify an operative word of the one or more words from the communication, wherein the operative word is related to an available action associated with a user device; identify a pre-defined intent associated with the operative word, wherein the pre-defined intent defines an action available to the user device; annotate the pre-defined intent to define a quality of an association between the communication and the pre-defined intent; select an agent profile from one or more agent profiles, wherein the agent profile is selected based on a correlation of the agent profile to the pre-defined intent and the quality of the association between the communication and the pre-defined intent, wherein agent profiles are associated with an agent and a terminal device; and route the communication, wherein when the communication is received at the terminal device associated with the selected agent profile, execution of the action is facilitated.

In some embodiments, the instructions that cause the system to identify the pre-defined intent further cause the system to perform a semantic analysis of the communication and an analysis of user input and communication statistics to determine the pre-defined intent.

In some embodiments, the correlation of the agent profile to the pre-defined intent and the quality of the association between the communication and the pre-defined intent is determined based on a score that reflects a suitability of the terminal device and an agent associated with the agent profile to respond to the communication.

In some embodiments, the instructions that cause the system to annotate the pre-defined intent to define the quality of an association between the communication and the pre-defined intent further cause the system to: provide the operative word and the pre-defined intent to a computing device to cause a the computing device to perform an evaluation of the quality of the association; and obtain, from the computing device, the evaluation of the quality of the association.

In some embodiments, the instructions that cause the system to identify the pre-defined intent associated with the operative word further cause the system to query a database including stored associations between stored operative words and intents, to identify an association between the operative word and the pre-defined intent.

In some embodiments, the instructions that cause the system to annotate the pre-defined intent to define the quality of an association between the communication and the pre-defined intent further cause the system to calculate the quality based on a second association between the operative word and the pre-defined intent. [0020]1 In some embodiments, the pre-defined intent is generated using artificial intelligence and an intent model, wherein the artificial intelligence is applied to the intent model to aggregate intent-related data and generate corresponding intents.

In one embodiment, a non-transitory computer-readable storage medium stores thereon executable instructions that, as a result of being executed by one or more processors of a computer system, cause the computer system to: identify an operative word from a communication, wherein the communication includes one or more words in a natural language and wherein the one or more words include the operative word; identify a pre-defined intent associated with the operative word, wherein the pre-defined intent defines an action available to a user device; annotate the pre-defined intent to define a quality of an association between the communication and the pre-defined intent; select an agent profile from one or more agent profiles, wherein the agent profile is selected based on a correlation of the agent profile to the pre-defined intent and the quality of the association between the communication and the pre-defined intent, wherein agent profiles are associated with an agent and a terminal device; and route the communication, wherein when the communication is received at a terminal device associated with the selected agent profile, execution of the action is facilitated.

In some embodiments, the executable instructions that cause the computer system to identify the operative word from the communication further cause the computer system to perform a query of a database including entries corresponding to stored operative words to obtain the operative word, wherein the query is performed using the one or more words as input.

In some embodiments, the correlation of the agent profile to the pre-defined intent indicates that the pre-defined intent matches an intent of which an agent associated with the agent profile is knowledgeable.

In some embodiments, the quality of the association between the communication and the pre-defined intent is determined based on a confidence score that indicates a confidence that the communication is associated with the pre-defined intent.

In some embodiments, the correlation of the agent profile to the pre-defined intent and the quality of the association between the communication and the pre-defined intent is determined based on a score that reflects a suitability of the terminal device and an agent associated with the agent profile to respond to the communication.

In some embodiments, the executable instructions that cause the computer system to route the communication further cause the computer system to establish a connection between the user device and the terminal device.

In some embodiments, the pre-defined intent is generated using artificial intelligence and an intent model, wherein the artificial intelligence is applied to the intent model to aggregate intent-related data and generate corresponding intents.

BRIEF DESCRIPTION OF THE DRAWINGS

The present disclosure is described in conjunction with the appended Figures:

FIGS. 10A-10G show exemplary customization interfaces for an intent-driven contact center in accordance with some aspects of the present technology;

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
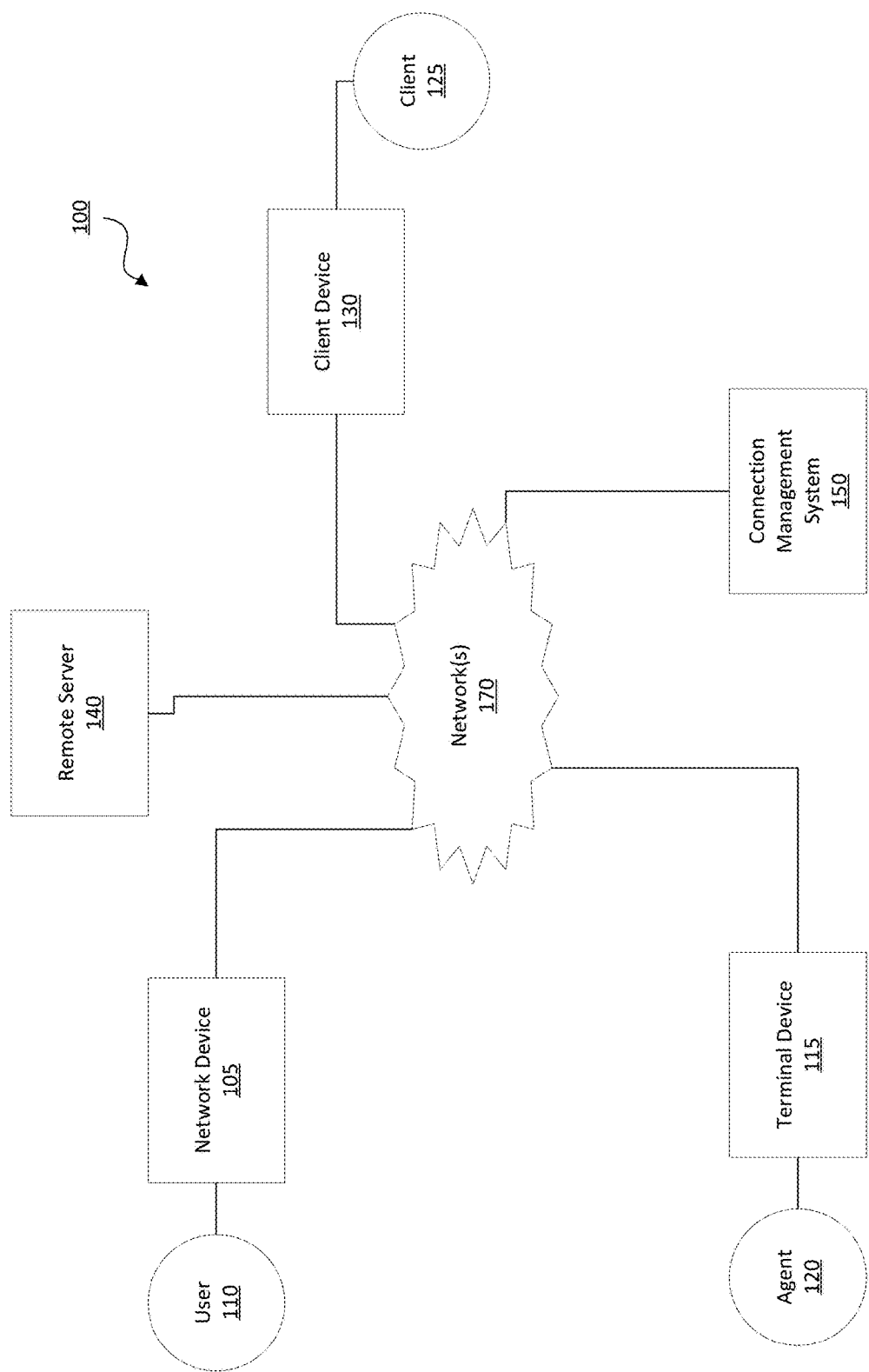
FIG. 1 shows an example embodiment of a network interaction system in accordance with some aspects of the present technology.

FIG. 1 shows a block diagram of an embodiment of a network interaction system 100 which implements and supports certain embodiments and features described herein. Certain embodiments relate to establishing connections between a network device 105 (which can be operated by a user 110), and a terminal device 115 (which can be operated by an agent 120) and/or a client device 130 (operated by a client 125).

In some embodiments, a user 110 can be an individual browsing a web site or accessing an online service provided by a remote server 140. In some embodiments, user 110 can be an individual looking to have a service performed on their behalf. Such a service can include having a question answered, operating another device, getting help from an agent with a task or service, conducting a transaction, etc.

A client 125 can be an entity that provides, operates, or runs the website or the online service, or individuals employed by or assigned by such an entity to perform the tasks available to a client 125 as described herein.

The agent 120 can be an individual, such as a support agent or sales associate tasked with providing support or information to the user 110 regarding the website or online service (e.g., information about products available at an online store). Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a sales associate employed by the company. In various embodiments, the user 110, client 125, and agent 120 can be other individuals or entities.

While FIG. 1 shows only a single network device 105, terminal device 115, and client device 130, an interaction system 100 can include multiple or many (e.g., tens, hundreds or thousands) of each of one or more of these types of devices. Similarly, while FIG. 1 shows only a single user 110, agent 120, and client 125, an interaction system 100 can include multiple or many of each of one or more of such entities. Thus, it may be necessary to determine which endpoint is to be selected to communicate with a given network device. Further complicating matters, a remote server 140 may also be configured to receive and respond to select communications with network device 105.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some embodiments, connection management system 150 routes the entire communication to another device. In some embodiments, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connections between network device 105 and one or more terminal devices 115. For example, upon receiving a communication from network device 105, connection management system 150 can estimate to which client (if any) the communication corresponds. Upon identifying a client, connection management system 150 can identify a terminal device 115 associated with the client for communication with network device 105. In some embodiments, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some embodiments, connection management system 150 can determine whether any connections are established between network device 105 and an endpoint associated with the client (or remote server 140) and, if so, whether such channels are to be used to exchange a series of communications including the communication.

Upon selecting an endpoint to communicate with network device 105, connection management system 150 can establish connections between the network device 105 and the endpoint. In some embodiments, connection management system 150 can transmit a message to the selected endpoint. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In some embodiments, communications between network device 105 and endpoint 112 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets. As will be described further herein, such configurations can facilitate management of conversations between user 110 and one or more endpoints.

In some embodiments, connection management system 150 can monitor the communication exchange in real-time and perform automated actions (e.g., rule-based actions, artificial intelligence originated actions, etc.) based on the live communications. For example, when connection management system 150 determines that a communication relates to a particular product, connection management system 150 can automatically transmit an additional message to the endpoint containing additional information about the product (e.g., quantity of products in stock, links to support documents related to the product, or other information about the product or similar products).

In some embodiments, a designated endpoint can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some embodiments, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115, and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal, IOT and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
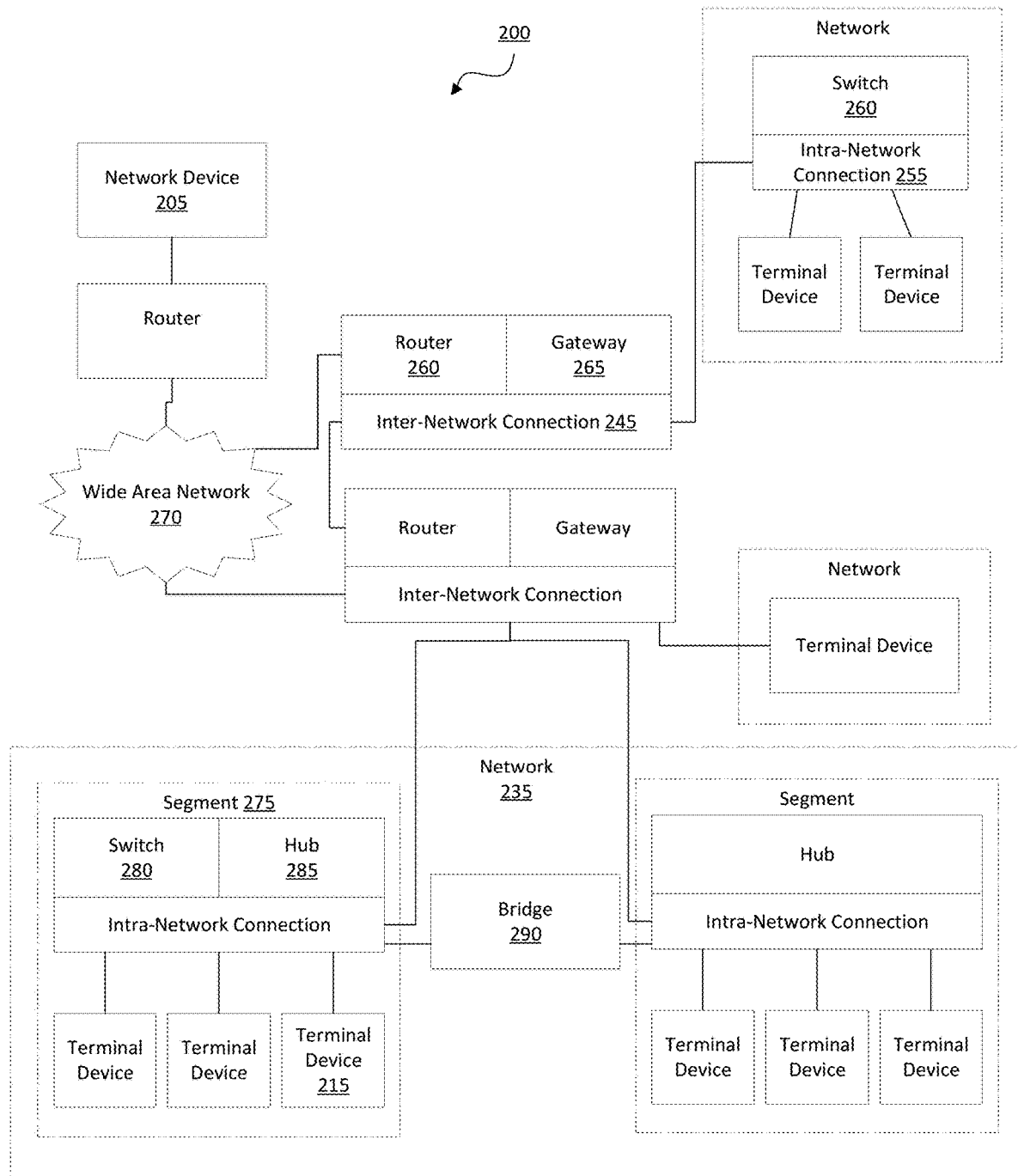
FIG. 2 shows an example embodiment of a network interaction system in accordance with some aspects of the present technology.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some embodiments, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some embodiments, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, In some embodiments, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
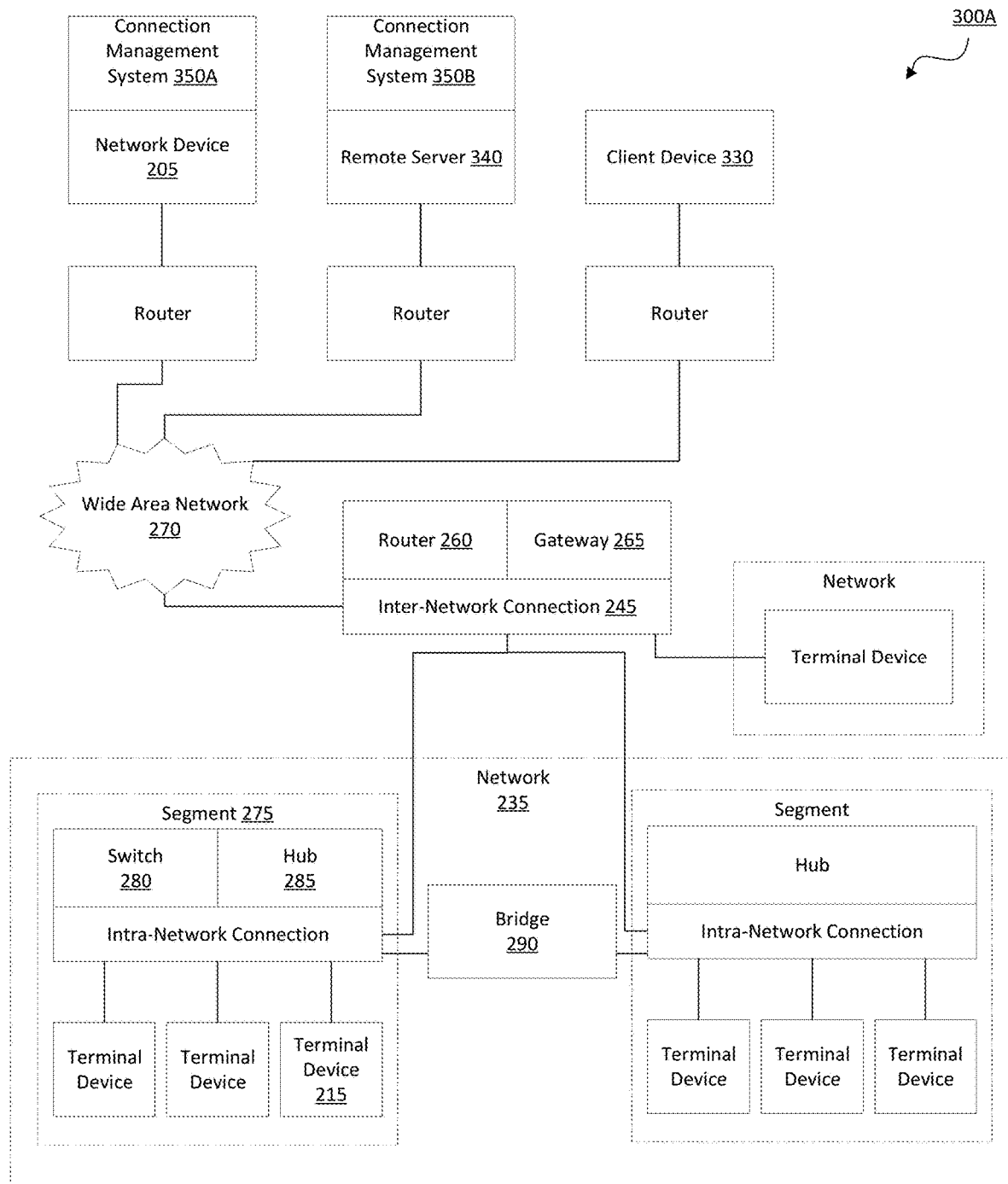
FIGS. 3A, 3B, and 3C show example embodiments of a network interaction system that includes a connection management system in accordance with some aspects of the present technology.
Figure 3B:
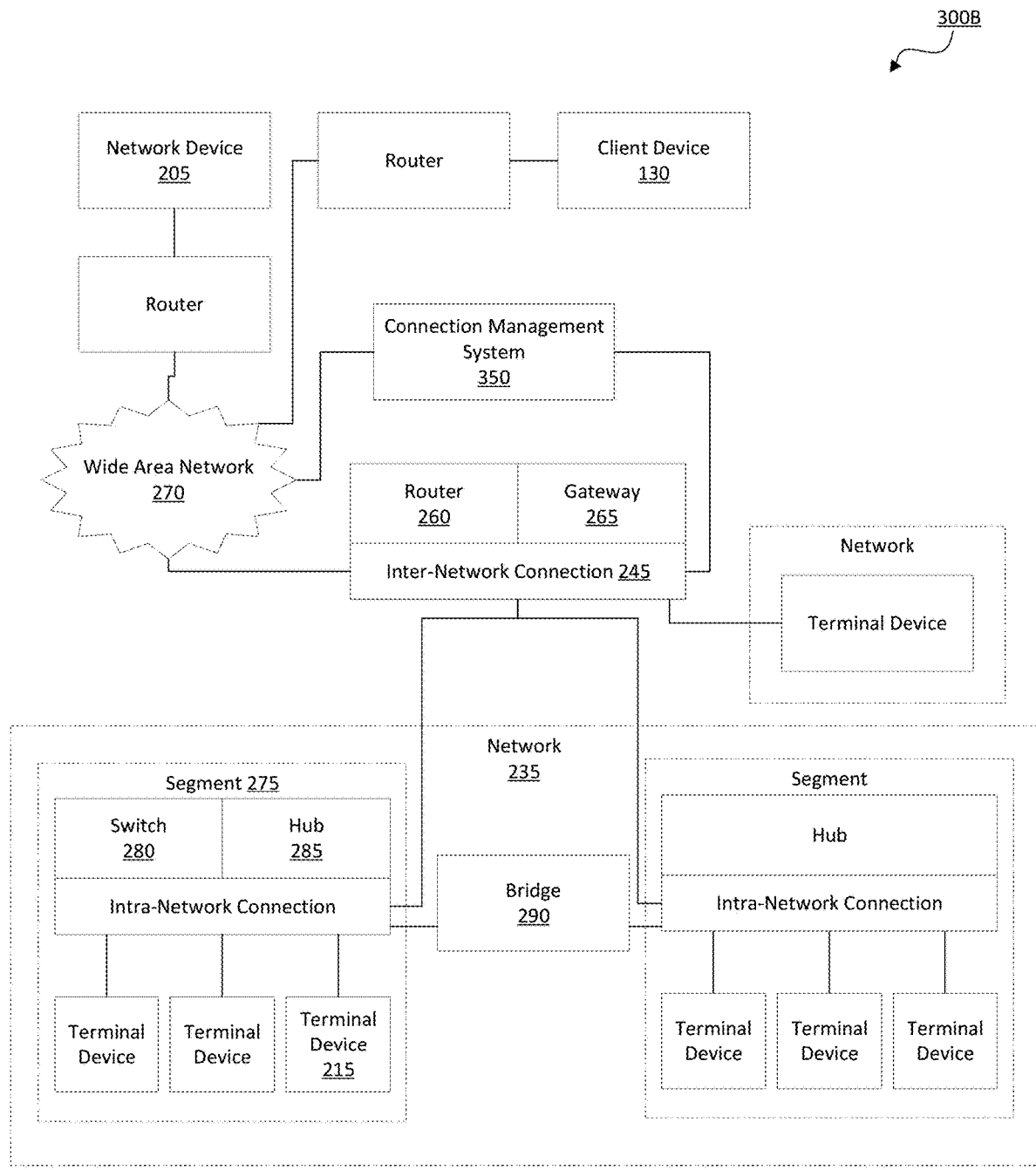
Figure 3C:
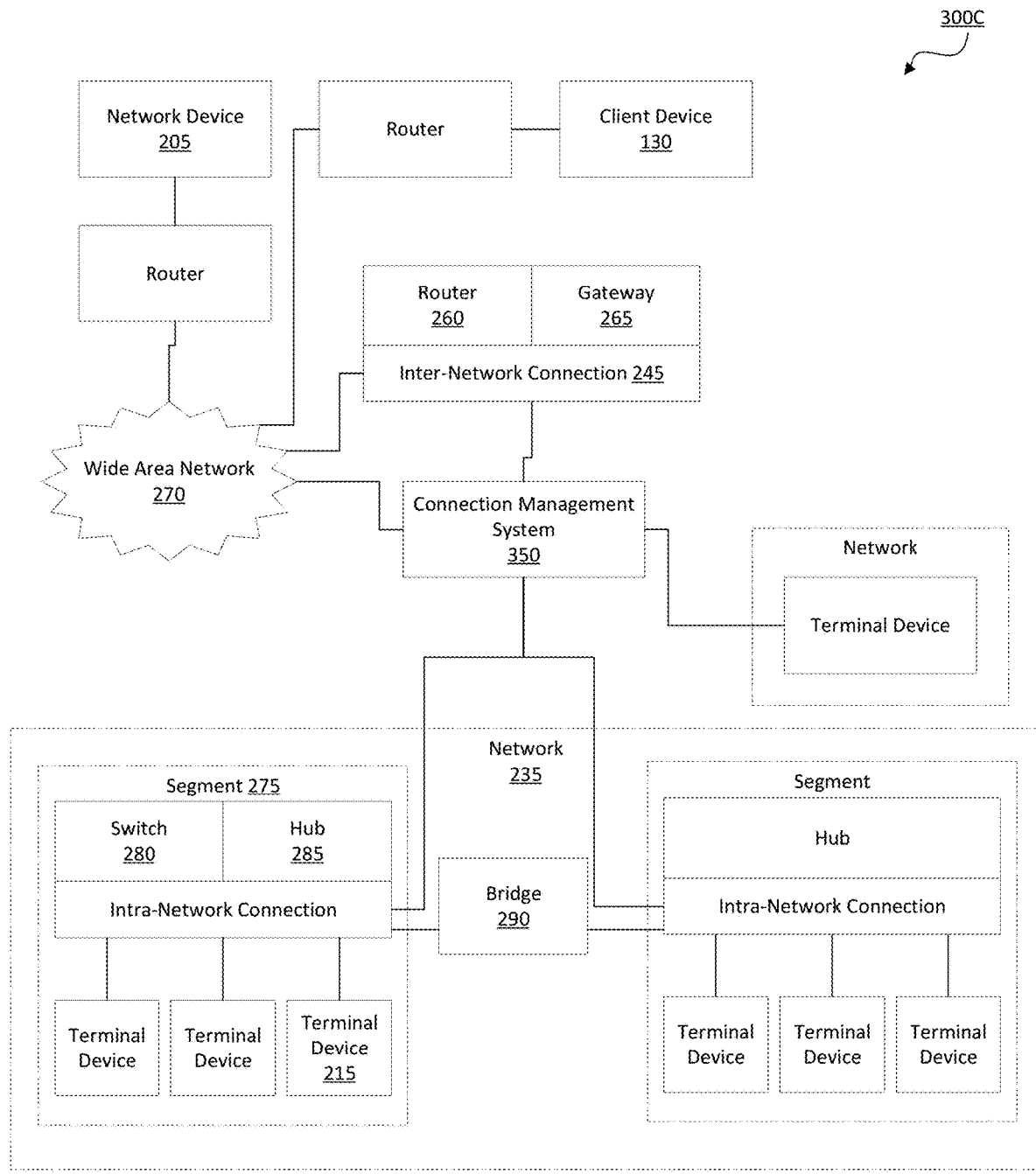

FIGS. 3A, 3B, 3C show block diagrams of other embodiments of a network interaction system 300a, 300b, 300c that includes a connection management system. Each of the depicted systems 300a, 300b, 300c show only two local-area networks 235 for simplicity, though it can be appreciated that embodiments can be extended to expand the number of local-area networks. Each of systems 300a, 300b, 300c include a connection management system 150, which can identify which terminal device is to communicate with network device 205, can establish and manage (e.g., maintain or close) connections, can determine whether and when to re-route communications in an exchange, and so on. Thus, connection management system 150 can be configured to dynamically, and in real-time, evaluate communications, agent availability, capabilities of terminal devices or agents, and so on, to influence routing determinations.

In FIG. 3A, connection management system 150 is associated with each of network device 205 and a remote server 340 (e.g., connection management system 150a is associated with network device 205 and connection management system 150b is associated with remote server 340). For example, connection management system 150a and/or connection management system 150b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 150b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 150b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 150 can be configured to serve as a relay and/or destination address. Thus, for example, a set of network devices 205 may transmit communications, each identifying connection management system 150 as a destination. Connection management system 150 can receive each communication and can concurrently monitor a set of terminal devices (e.g., so as to generate metrics for each terminal device). Based on the monitoring and a rule, connection management system 150 can identify a terminal device 215 to which it may relay each communication. Depending on the embodiment, terminal device communications may similarly be directed to a consistent destination (e.g., of connection management system 150) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 150 is directly connected to intra-network components (e.g., terminal devices, intra-network connections, or other).

It will be appreciated that many variations of FIGS. 3A-3C are contemplated. For example, connection management system 150 may be associated with a connection component (e.g., inter-network connection component 245 or intra-network connection component 255) such that an application corresponding to connection management system 150 (or part thereof) is installed on the component. The application may, for example, perform independently or by communicating with one or more similar or complementary applications (e.g., executing on one or more other components, network devices or remotes servers).

Figure 4:
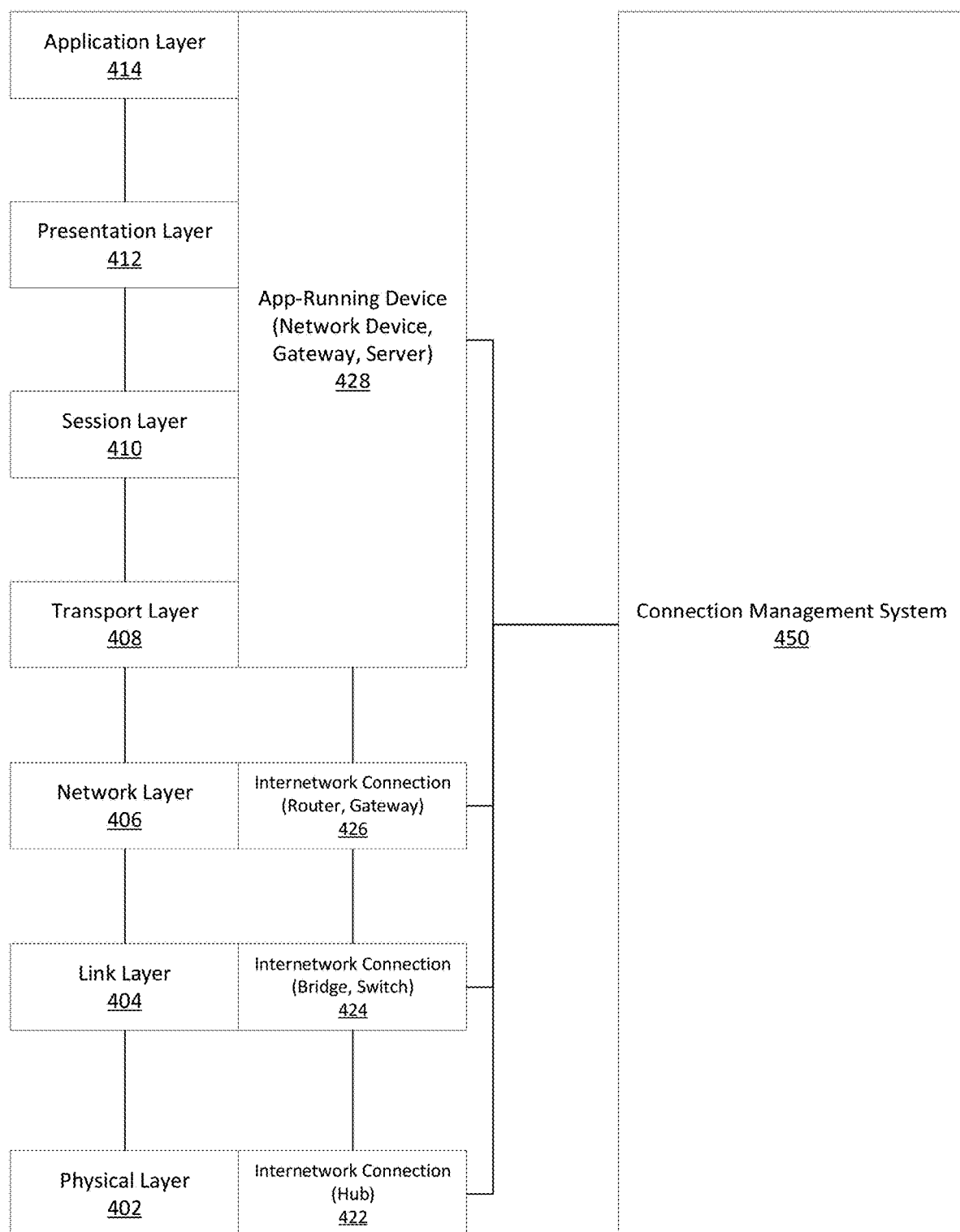
FIG. 4 shows a representation of a protocol-stack mapping of connection components' operation in accordance with some aspects of the present technology.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402, 404,406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402, 404, 406, 408, 410, 412414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406, 408, 410, 412, 414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 150 can interact with and/or operate on, in various embodiments, one, more, all or any of the various layers. For example, connection management system 150 can interact with a hub so as to dynamically adjust which terminal devices the hub communicates. As another example, connection management system 150 can communicate with a bridge, switch, router or gateway so as to influence which terminal device the component selects as a destination (e.g., MAC, logical or physical) address. By way of further examples, a connection management system 150 can monitor, control, or direct segmentation of data packets on transport layer 408, session duration on session layer 410, and/or encryption and/or compression on presentation layer 412. In some embodiments, connection management system 150 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 150 can influence communication routing and channel establishment (or maintenance or termination) via interaction with a variety of devices and/or via influencing operating at a variety of protocol-stack layers.

Figure 5:
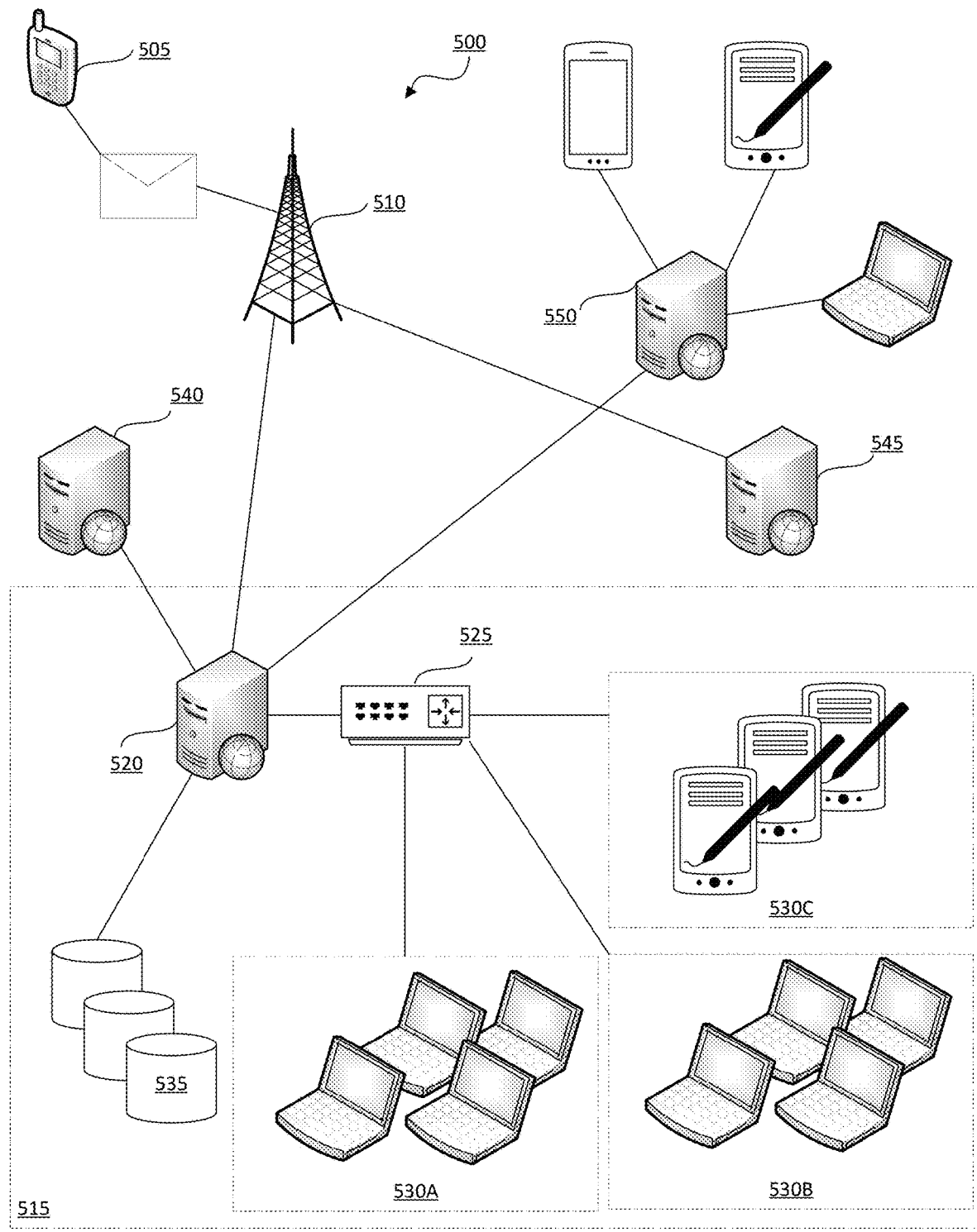
FIG. 5 represents a multi-device communication exchange system embodiment in accordance with some aspects of the present technology.

FIG. 5 represents a multi-device communication exchange system 500 according to an embodiment. System 500 includes a network device 505 configured to communicate with a variety of types of endpoints over a variety of types of communication channels.

In the depicted instance, network device 505 can transmit a communication over a cellular network (e.g., via a base station 510). The communication can be routed to an operative network 515. Operative network 515 can include a connection management system 150 that receives the communication and identifies which endpoint is to respond to the communication. Such determination can depend on identifying a client to which that communication pertains (e.g., based on a content analysis or user input indicative of the client) and determining one or more metrics for each of one or more endpoints associated with the client. For example, in FIG. 5, each cluster of endpoints 530a, 530b, -530c can correspond to a different client. The endpoints may be geographically co-located or disperse. The metrics may be determined based on stored or learned data and/or real-time monitoring (e.g., based on availability).

Connection management system 150 can communicate with various endpoints via one or more routers 525 or other inter-network or intra-network connection components. Connection management system 150 may collect, analyze and/or store data from or pertaining to communications, terminal-device operations, client rules, and/or user-associated actions (e.g., online activity, account data, purchase history, etc.) at one or more data stores. Such data may influence communication routing.

Notably, various other devices can further be used to influence communication routing and/or processing. For example, in the depicted instance, connection management system 150 also is connected to a web server 545. Thus, connection management system 540 can retrieve data of interest, such as technical product details, news, current product offerings, current or predicted weather, and so on.

Network device 505 may also be connected to a web server (e.g., including a streaming web server 545). In some embodiments, communication with such a server provided an initial option to initiate a communication exchange with connection management system 150. For example, network device 505 may detect that, while visiting a particular webpage, a communication opportunity is available and such an option can be presented.

In some embodiments, one or more elements of communication system 500 can also be connected to a social-networking server 550. Social networking server 550 can aggregate data received from a variety of user devices. Thus, for example, connection management system 150 may be able to estimate a general (or user-specific) intent towards a given topic or estimate a general behavior of a given user or class of users. Social networking server 550 can also maintain a social graphs for one or more users. A social graph can consist of first level connections (direct connections) of a social user, and additional levels of connections (indirect connections through the user's direct connections).

Figure 6:
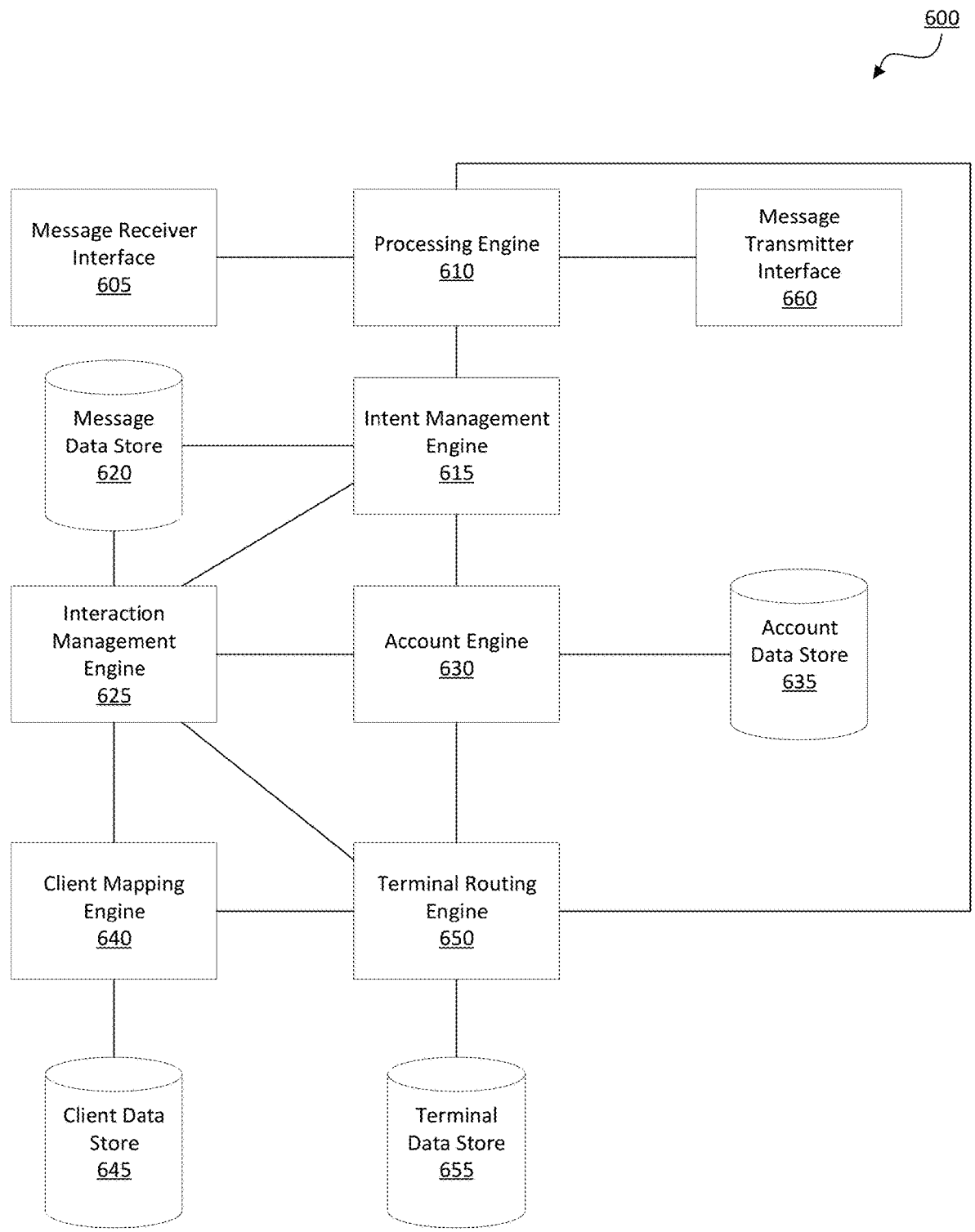
FIG. 6 shows an example embodiment of a connection management system in accordance with some aspects of the present technology.

FIG. 6 shows a block diagram of an embodiment of a connection management system 150. A message receiver interface 605 can receive a message. In some embodiments, the message can be received, for example, as part of a communication transmitted by a source device (e.g., housed separately from connection management system 150 or within a same housing), such as a network device or endpoint. In some embodiments, the communication can be part of a series of communications or a communicate exchange, which can include a series of messages or communication exchange being routed between two devices (e.g., a network device and endpoint). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some embodiments, the message can include a message generated based on inputs received at an user interface. For example, the message can include a message that was generated based on button or key presses or recorded speech signals, or speech to text software. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some embodiments, the message can be a natural language communication, whether spoken or typed. A natural language communication, as used herein, refers to ordinary use of a language used to communicate amongst humans, and is contrasted with use of language defined by a protocol required for communicating with a specific virtual assistant or artificial intelligence tool. A natural language communication should not require constraints such as the use of a wake word to alert an artificial intelligence tool that a communication is addressed to the artificial intelligence. Additionally, a natural language communication should not require the user to identify particular key words, specific phrases, or explicitly name a service in order to understand how to service the communication.

While the present technology utilizes natural language communications, the communications can identify particular key words, specific phrases, or explicitly name a service. For example, the message can include or be associated with an identifier of a client. For example, the message can explicitly identify the client (or a device associated with the client); the message can include or be associated with a webpage or app associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

An intent management engine 615 may assess the (e.g., extracted or received) message. The assessment can include identifying, for example, one or more intents for the message. Examples of intents can include (for example) topic, sentiment, complexity, and urgency A topic can include, but it not limited to, a subject, a product, a service, a technical issue, a use question, a complaint, a refund request or a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some embodiments, the assessment of the message is performed using artificial intelligence or machine learning model configured to conduct a semantic analysis of the message and determine the intent. The semantic meaning for a particular class can be defined using a training data set and the machine learning model. To perform this classification based upon semantic similarity, the message may be encoded using an encoder model that is trained on data that converts the natural language into a vector representation. A convolutional neural network may be used to classify the vectors into different semantic classes. In some embodiments, the message is passed through a keyword matching system to determine whether any of the words in the message correspond to operative words. If no operative words are detected, the message may be processed using the artificial intelligence or the machine learning model to identify the operative words.

In some embodiments, an intent can be clarified by engaging user 110 in a conversation that can include clarifying questions, or simply requesting additional information.

An interaction management engine 625 can determine to which endpoint a communication is to be routed and how the receiving and transmitting devices are to communicate. Each of these determinations can depend, for example, on whether a particular network device (or any network device associated with a particular user) has previously communicated with an endpoint in a set of endpoints (e.g., any endpoint associated with connection management system 150 or any endpoint associated with one or more particular clients).

In some embodiments, when a network device (or other network device associated with a same user or account) has previously communicated with a given endpoint (e.g., about matters relating to a client), communication routing can be generally biased towards the same endpoint. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more endpoints); whether the endpoint is available; and/or a predicted response latency of the endpoint. Such factors may be considered absolutely or relative to similar metrics corresponding to other endpoints. A re-routing rule (e.g., a client-specific or general rule) can indicate how such factors are to be assessed and weighted to determine whether to forego agent consistency.

When a network device (or other network device associated with a same user or account) has not previously communicated with a given endpoint (e.g., about matters relating to a client), an endpoint selection can be performed based on factors such as, for example, an extent to which various agents' knowledge base corresponds to a communication topic, availability of various agents at a given time and/or over a channel type, types and/or capabilities of endpoints, a language match between a user and agents, and/or a personality analyses. In one instance, a rule can identify how to determine a sub-score to one or more factors such as these and a weight to assign to each score. By combining (e.g., summing) weighted sub-scores, a score for each agent can be determined. An endpoint selection can then be made by comparing endpoints' scores (e.g., to select a high or highest score).

With regard to determining how devices are to communicate, interaction management engine 625 can (for example) determine whether an endpoint is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more endpoints. Appreciably, some communication types will result in real-time communication (e.g., where fast message response is expected), while others can result in asynchronous communication (e.g., where delays (e.g., of several minutes or hours) between messages are acceptable).

In some embodiments, the communication type can be a text messaging or chat application. These communication technologies provide the benefit that no new software needs to be downloaded and executed on users' network devices.

Further, interaction management engine 625 can determine whether a continuous channel between two devices should be established, used or terminated. A continuous channel can be structured so as to facilitate routing of future communications from a network device to a specified endpoint. This bias can persist even across message series (e.g., days, weeks or months). In some embodiments, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and endpoint. The score may pertain to an overall match or one specific to a given communication or communication series. Thus, for example, the score may reflect a degree to which a given endpoint is predicted to be suited to respond to a network-device communication. In some embodiments, a score analysis can be used to identify each of an endpoint to route a given communication to and whether to establish, use or terminate a connection. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message query. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different endpoint.

To illustrate, a set of three endpoints associated with a client may be evaluated for potential communication routing. A score may be generated for each that pertains to a match for the particular communication. Each of the first two endpoints may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third endpoint is immediately available. It may be predicted that the second endpoint will be available for responding within 15 minutes, but that the first endpoint will not be available for responding until the next day. Thus, a fast-response sub-score for the first, second and third devices may be 1, 3 and 10. Finally, it may be estimated a degree to which an agent (associated with the endpoint) is knowledgeable about a topic in the communication. It may be determined that an agent associated with the third endpoint is more knowledgeable than those associated with the other two devices, resulting in sub-scores of 3, 4 and 9. In this example, the rule does not include weighting or normalization parameters (though, in other instances, a rule may), resulting in scores of 14, 11 and 19. Thus, the rule may indicate that the message is to be routed to a device with the highest score, that being the third endpoint. If routing to a particular endpoint is unsuccessful, the message can be routed to a device with the next-highest score, and so on.

A score may be compared to one or more absolute or relative thresholds. For example, scores for a set of endpoints can be compared to each other to identify a high score to select an endpoint to which a communication can be routed. As another example, a score (e.g., a high score) can be compared to one or more absolute thresholds to determine whether to establish a continuous channel with an endpoint. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or endpoint in an account data store 635 to identify an account corresponding to the device. Further, account engine 630 can maintain data about previous communication exchanges (e.g., times, involved other device(s), channel type, resolution stage, topic(s) and/or associated client identifier), communication channels (e.g., indicating—for each of one or more clients—whether any channels exist, an endpoint associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, an endpoint, an account and a client. Account engine 635 can subsequently notify a user of the channel's existence such that the user can be aware of the agent consistency being availed.

Interaction management engine 625 can further interact with a client mapping engine 640, which can map a communication to one or more clients (and/or associated brands). In some embodiments, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some embodiments, a message may not particularly correspond to any client. For example, a message may include a general query. Client mapping engine 640 may, for example, perform a semantic analysis on the message, identify one or more keywords and identify one or more clients associated with the keyword(s). In some embodiments, a single client is identified. In some embodiments, multiple clients are identified. An identification of each client may then be presented via a network device such that a user can select a client to communicate with (e.g., via an associated endpoint).

Client data store 645 can include identifications of one or more endpoints (and/or agents) associated with the client. A terminal routing engine 650 can retrieve or collect data pertaining to each of one, more or all such endpoints (and/or agents) so as to influence routing determinations. For example, terminal routing engine 650 may maintain an endpoint data store 655, which can store information such as endpoints' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether an endpoint is available may be dynamically updated based on (for example) a communication from an endpoint (e.g., identifying whether the device is asleep, being turned off/on, idle/active, or identifying whether input has been received within a time period); a communication routing (e.g., indicative of whether an endpoint is involved in or being assigned to be part of a communication exchange); or a communication from a network device or endpoint indicating that a communication exchange has ended or begun.

It will be appreciated that, in various contexts, being engaged in one or more communication exchanges does not necessarily indicate that an endpoint is not available to engage in another communication exchange. Various factors, such as communication types (e.g., text, message, email, chat, phone), client-identified or user-identified target response times, and/or system loads (e.g., generally or with respect to a user) may influence how many exchanges an endpoint may be involved in.

When interaction management engine 625 has identified an endpoint to involve in a communication exchange or connection, it can notify terminal routing engine 650, which may retrieve any pertinent data about the endpoint from endpoint data store 655, such as a destination (e.g., IP) address, device type, protocol, etc. Processing engine 610 can then modify the message-inclusive communication or generate a new communication (including the message) so as to have a particular format, comply with a particular protocol, and so on. In some embodiments, a new or modified message may include additional data, such as account data corresponding to a network device, a message chronicle, and/or client data.

A message transmitter interface 660 can then transmit the communication to the endpoint. The transmission may include, for example, a wired or wireless transmission to a device housed in a separate housing. The endpoint can include an endpoint in a same or different network (e.g., local-area network) as connection management system 150. Accordingly, transmitting the communication to the endpoint can include transmitting the communication to an inter- or intra-network connection component.

Figure 7:
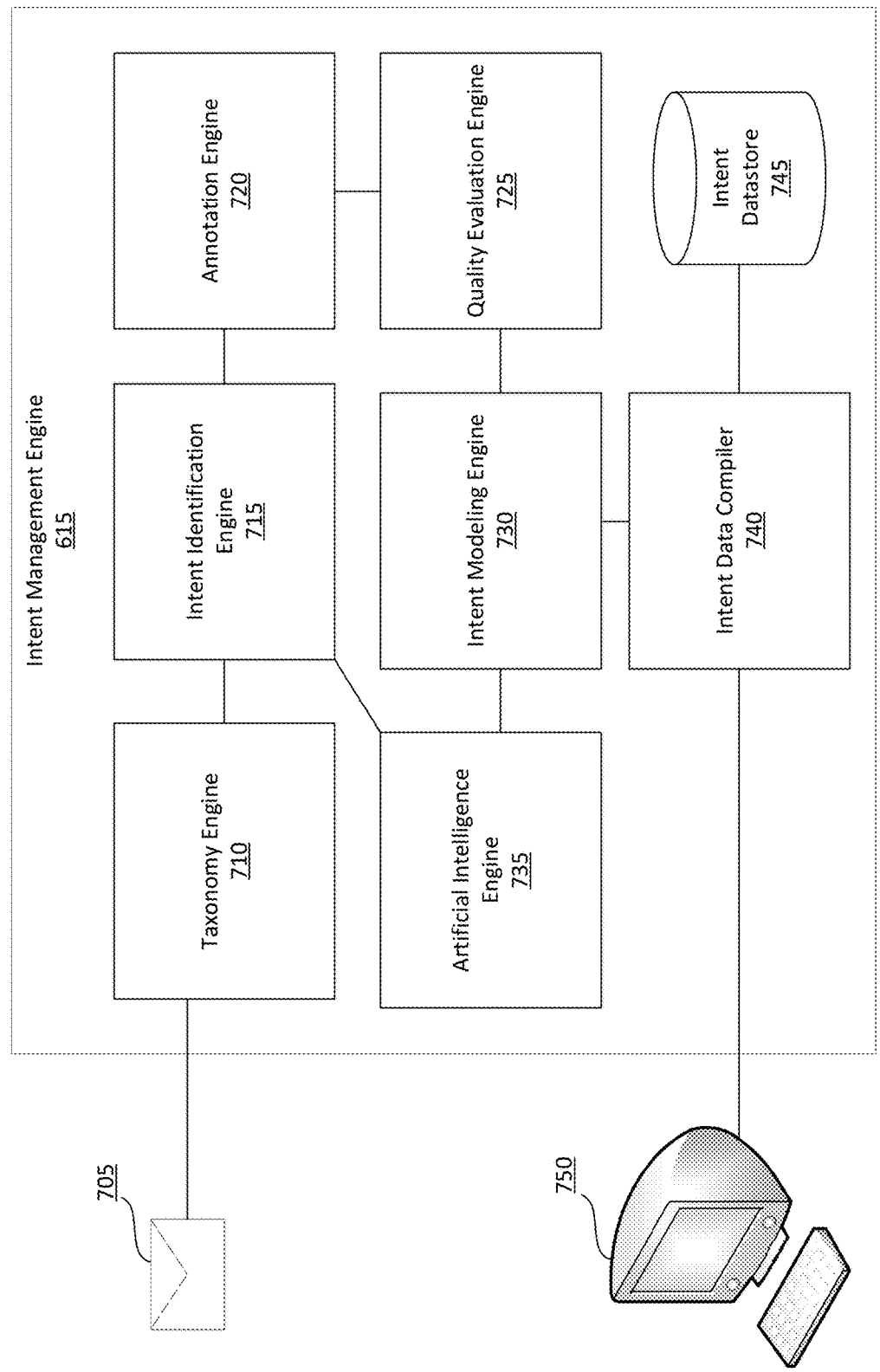
FIG. 7 shows an example embodiment of an intent management engine in accordance with some aspects of the present technology.

FIG. 7 shows an example embodiment of an intent management engine 615 in accordance with some aspects of the present technology. The intent management engine 615 may receive a communication 705. The communication 705 may be processed by a taxonomy engine 710, an intent identification engine 715, an annotation engine 720, a quality evaluation engine 725, an intent modeling engine 730, an artificial intelligence engine 735, and an intent data compiler 740. The resulting compiled data may be provided to an interface of a computing device 750, such as a network device, a client device, and/or a terminal device for analysis and/or manipulation, as described further herein.

Communication 705 may be provided to a taxonomy engine 710. Communication 705 may be in natural language as described herein and may include one or more words. Taxonomy engine may be configured to, in conjunction with a processor, parse the communication 705 to identify one or more keywords, also referred to herein as "operative words". The operative words may be related to an action available to a user initiating the communication 705. For example, communication 705 may state, "I want to pay my bill." The operative words may be "pay bill". The taxonomy engine 710 may pass the operative words to the intent identification engine.

The intent identification engine 715 may, in conjunction with a processor, receive the operative words from the taxonomy engine 710. The intent identification engine 715 may use the operative words to identify an intent. The intent may define the action available to the user originating the communication 705. In some embodiments, the intents may be predefined and stored in an intent datastore 745. In such embodiments, the intent identification engine 715 may query the intent datastore 745 with the operative words to locate a corresponding predefined intent. For example, the intent identification engine 715 may query the intent datastore 745 with the words "pay bill" to identify a closest matching intent of "pay_current_bill". In some embodiments, the operative words may not correspond to an existing intent. In such embodiments, the intent identification engine 715 can create a new intent and save it to the intent datastore 745 in correlation with the operative words received. The intent identification engine 715 may pass the identified intent to the annotation engine 720.

The annotation engine 720 may, in conjunction with a processor, receive the identified intent from the intent identification engine 715. The annotation engine 720 may facilitate annotation of the identified intent. Annotation may define a quality of the association between the communication and the identified intent. In some embodiments, the annotation engine 720 may automatically evaluate the quality of the association by applying a formula. For example, the annotation engine 720 may automatically calculate a quality of 66% between the operative words "pay bill" and the intent "pay_current_bill", while a quality of 100% may be assigned to the operative words "pay bill" and the intent "pay_bill". In some embodiments, the annotation engine 720 may provide the operative words and the identified intent to a user interface of a computing device in order to receive a manual evaluation of the quality of the association.

The intent modeling engine 730 is configured to, in conjunction with a processor, build a model of intents based on the taxonomy and annotations made for the intents. The model may be used to help refine the intents, add new intents, associate different taxonomy with an intent, associate different intents with certain taxonomy, and the like.

The artificial intelligence engine 735 is configured to, in conjunction with a processor, apply artificial intelligence to the intent model to aggregate intent-related data and draw conclusions about actions that may be taken based on the results and analysis. The artificial intelligence engine 735 may be implemented by, for example, a Watson computer to learn, apply, and iteratively develop better models for reflecting intents.

The intent data compiler 740 is configured to, in conjunction with a processor, aggregate the information output by the artificial intelligence 735 and formulate it in such a way that can be displayed by the computing device 750. The computing device 750 is able to manipulate and configure the data displayed and analyzed.

Figure 8:
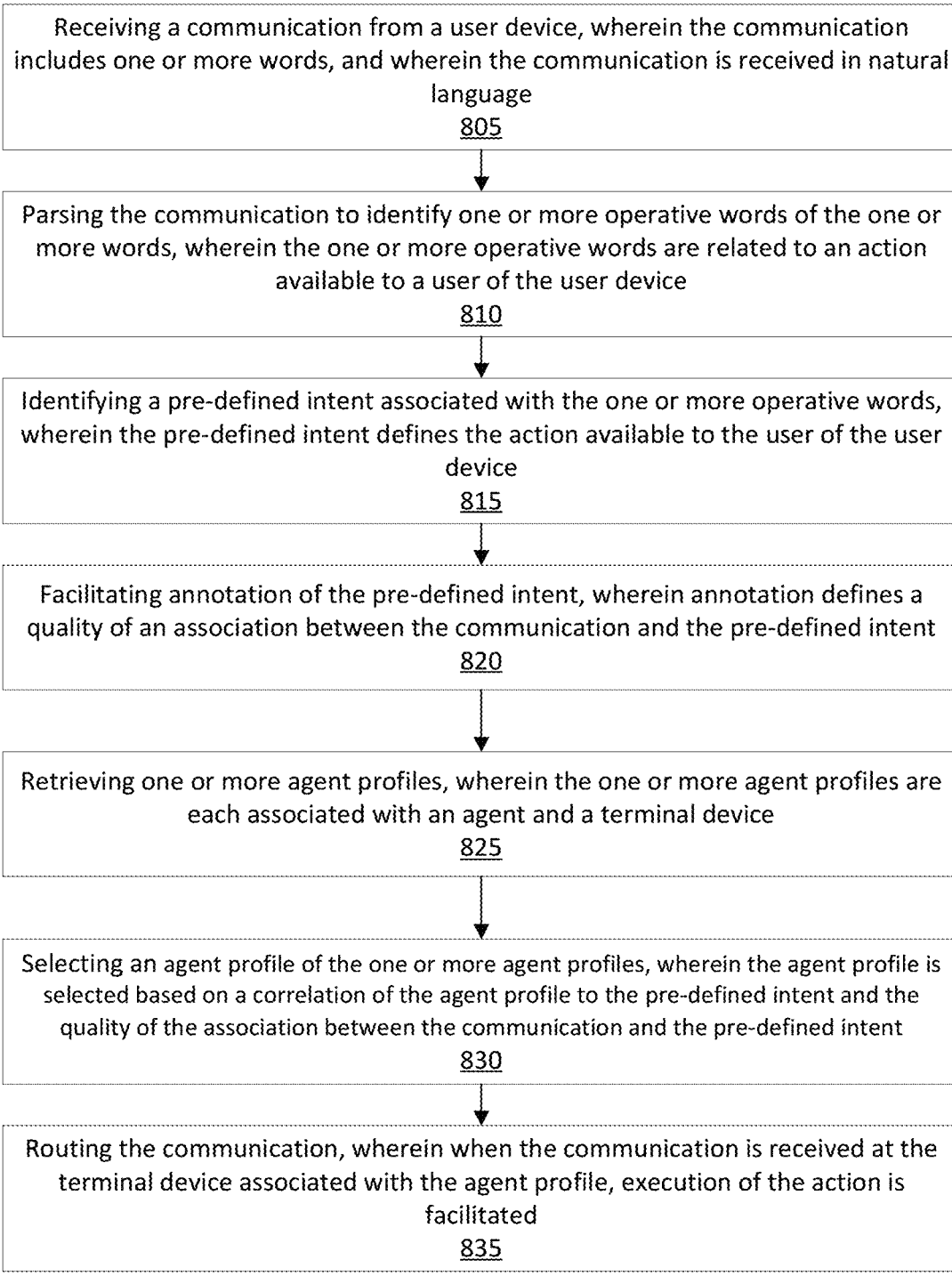
FIG. 8 shows a flowchart of a method embodiment in accordance with some aspects of the present technology.

FIG. 8 shows a flowchart of a method embodiment in accordance with some aspects of the present technology. The described method describes an embodiment of operating an intent-driven contact center. At step 805, a communication is received from a user device. The communication may include one or more words. The communication may be in natural language, as described further herein.

At step 810, the communication is parsed to identify one or more operative words of the one or more words. The one or more operative words may be related to an action available to a user of the user device. For example, the communication may state, "I want to speak to a representative." The operative word in that communication may be "representative". The operative words may be identified by comparing the words to identified operative words in a database.

At step 815, a pre-defined intent associated with the one or more operative words may be identified. The pre-defined intent may define the action available to the user of the device. For example, for the operative word "representative", the pre-defined intent may be "transfer_to_agent". The pre-defined intent may be identified, in some embodiments, through stored associations between operative words and intents, as stored in a database. Thus, the pre-defined intent may be identified through a search of an intent database.

At step 820, annotation of the pre-defined intent may be facilitated. Annotation may define a quality of an association between the communication and the pre-defined intent. Annotation may be done automatically by applying algorithms in one embodiment. In some embodiments, annotation may be completed manually based on the correlation of the original communication and the identified intent. The quality can be annotated in any suitable form, including words (e.g., "yes" and "no"), percentages (e.g., "80%"), numbers (e.g., on a scale from 1 to 10), etc.

At step 825, one or more agent profiles are retrieved. The one or more agent profiles may each be associated with an agent and a terminal device. An agent profile may comprise information associated with an agent having knowledge in a particular intent, category, subject or topic. The agent profile may further include ratings, resolution times, workload, experience, fee structure, geographical location, intents of interest, training needs, difficulty levels, and the like.

At step 830, an agent profile of the one or more agent profiles may be selected. The agent profile may be selected based on a correlation of the agent profile to the pre-defined intent and the quality of the association between the communication and the pre-defined intent. The correlation of the agent profile to the pre-defined intent may indicate that the pre-defined intent matches, or is closest to, an intent of which the agent is knowledgeable or has experience, for example. The agent profile may further be selected based on the quality of the association between the communication and the pre-defined intent. For example, if there is 100% confidence that the communication is associated with the pre-defined intent, a certain agent very knowledgeable with that intent may be selected. If the confidence is relatively low, e.g., 50%, an agent less knowledgeable with that intent may be selected because it is less likely that the correct intent was identified, and the most knowledgeable agent may not be needed.

At step 835, the communication may be routed. When the communication is received at the terminal device associated with the agent profile, execution of the action is facilitated. For example, if the intent indicates that a user wants to speak to a agent, a communication channel may be opened between the user and the agent.

Figure 9A:
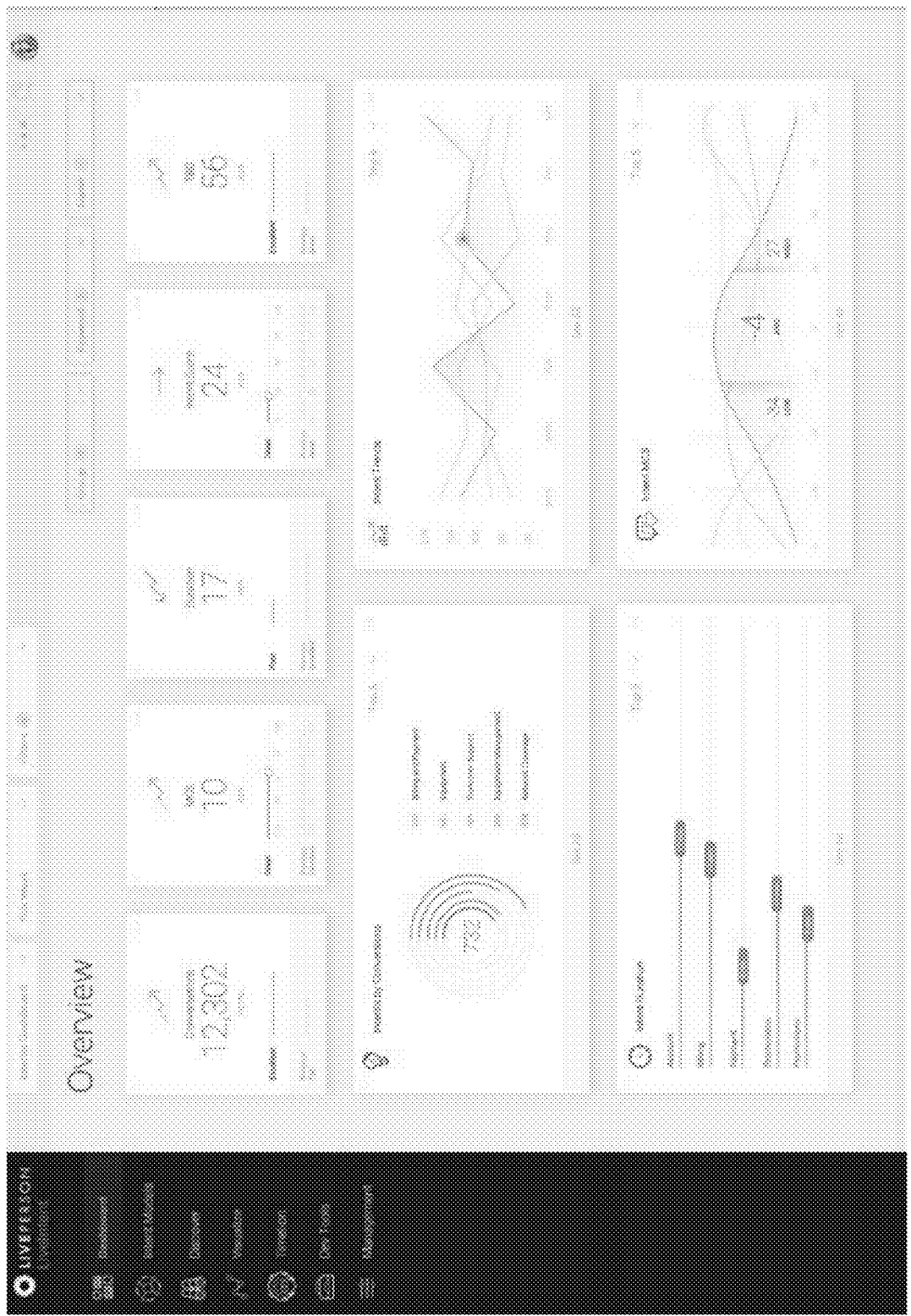
FIGS. 9A-9D show exemplary dashboard reports for an intent-driven contact center in accordance with some aspects of the present technology.

FIGS. 9A-9D show exemplary dashboard reports for an intent-driven contact center in accordance with some aspects of the present technology. FIG. 9A is a screen shot of a dashboard showing metrics for communications and intents. For example, FIG. 9A illustrates a number of conversations, an average duration of a communication session, an intent score, intents by conversations, intent trends, intent durations, etc. These analytics can become available as users contact the intent-driven contact center and their intents are ascertained.

Figure 9B:
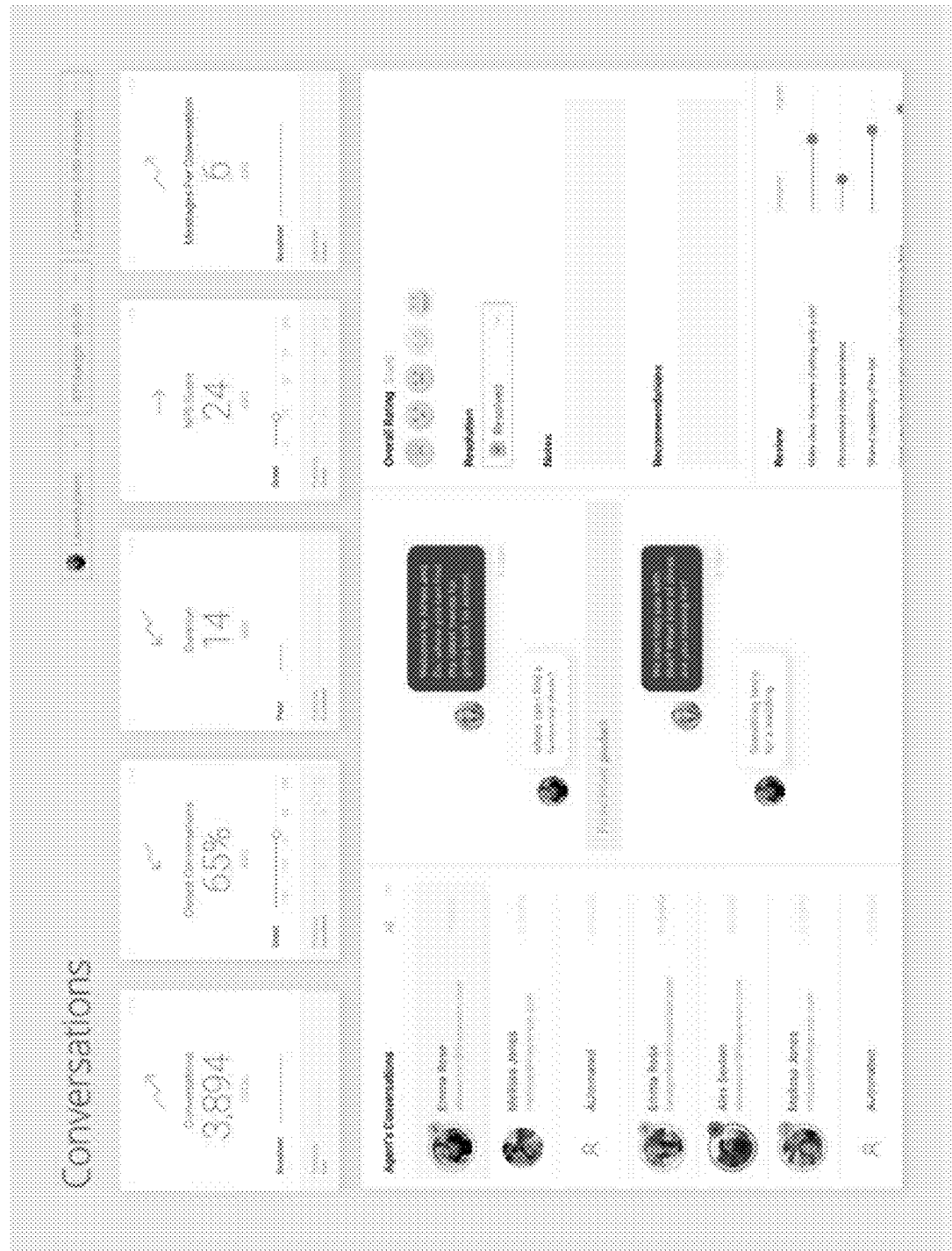

FIG. 9B is a screen shot of a dashboard showing agent conversations with users. The dashboard shows messages exchanged with the user, overall metrics for agent conversations, and ratings and resolutions boxes.

Figure 9C:
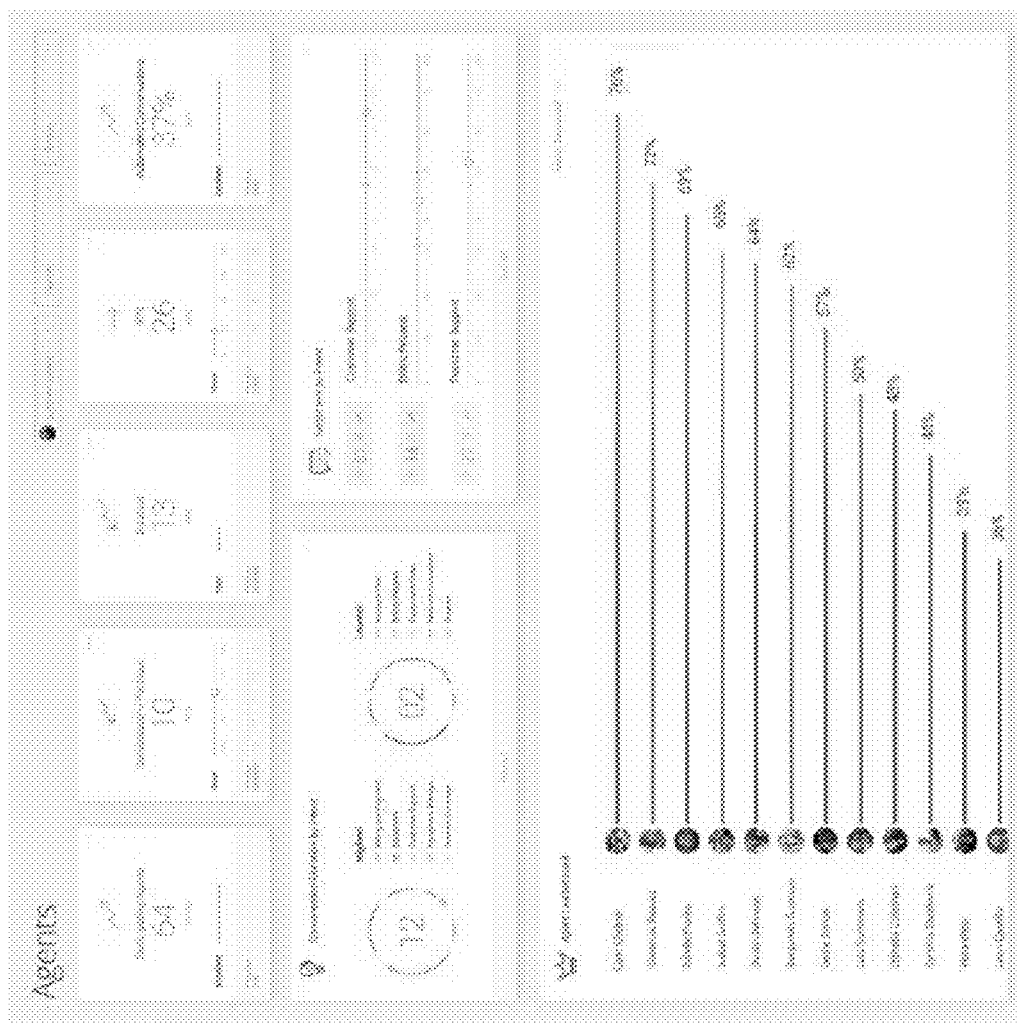

FIG. 9C is a screen shot of a dashboard showing agent metrics. The dashboard shows an agent leaderboard ranking agents based on their performance. The dashboard also shows metrics, such as sentiments by intent, conversation duration by intent, number of participating agents, number of conversations per hour, and average duration of conversations.

Figure 9D:

FIG. 9D is a screen shot of a dashboard showing metrics for communications and intents. For example, FIG. 9D illustrates a number of conversations, an average duration of a communication session, an intent score, intents by conversations, intent trends, intent durations, etc. These analytics can become available as users contact the intent-driven contact center and their intents are ascertained.

Figure 10A:
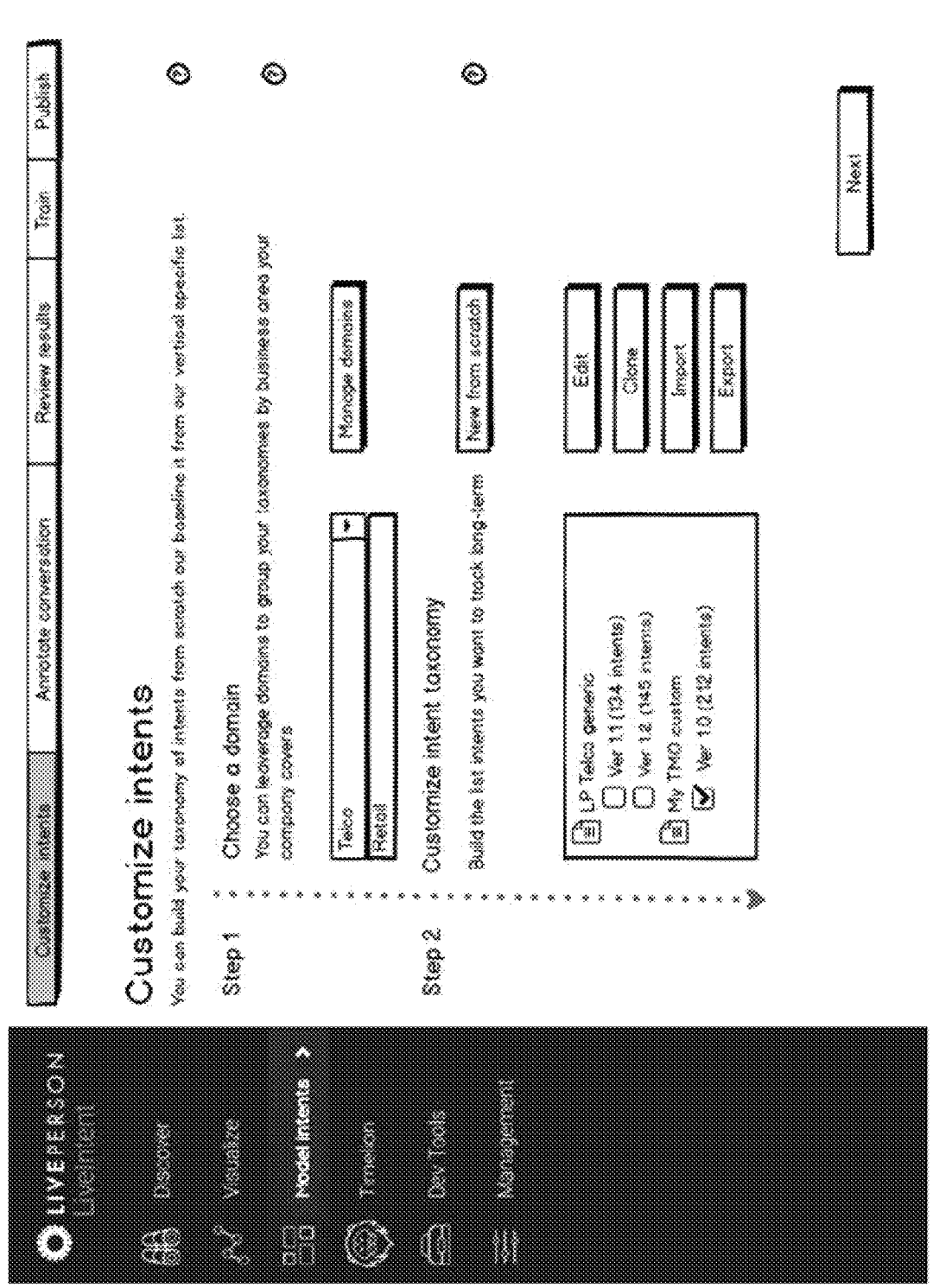

FIGS. 10A-10G show exemplary customization interfaces for an intent-driven contact center in accordance with some aspects of the present technology. FIG. 10A is a screen shot of an interface showing how intents can be customized on the backend of the intent-driven contact center. A taxonomy of intents may either be entered manually or selected from a pre-defined list. The intents can be grouped together according to domain, and each domain may have its own set of intents. The set of intents can be saved by version as generic or customized.

Figure 10B:
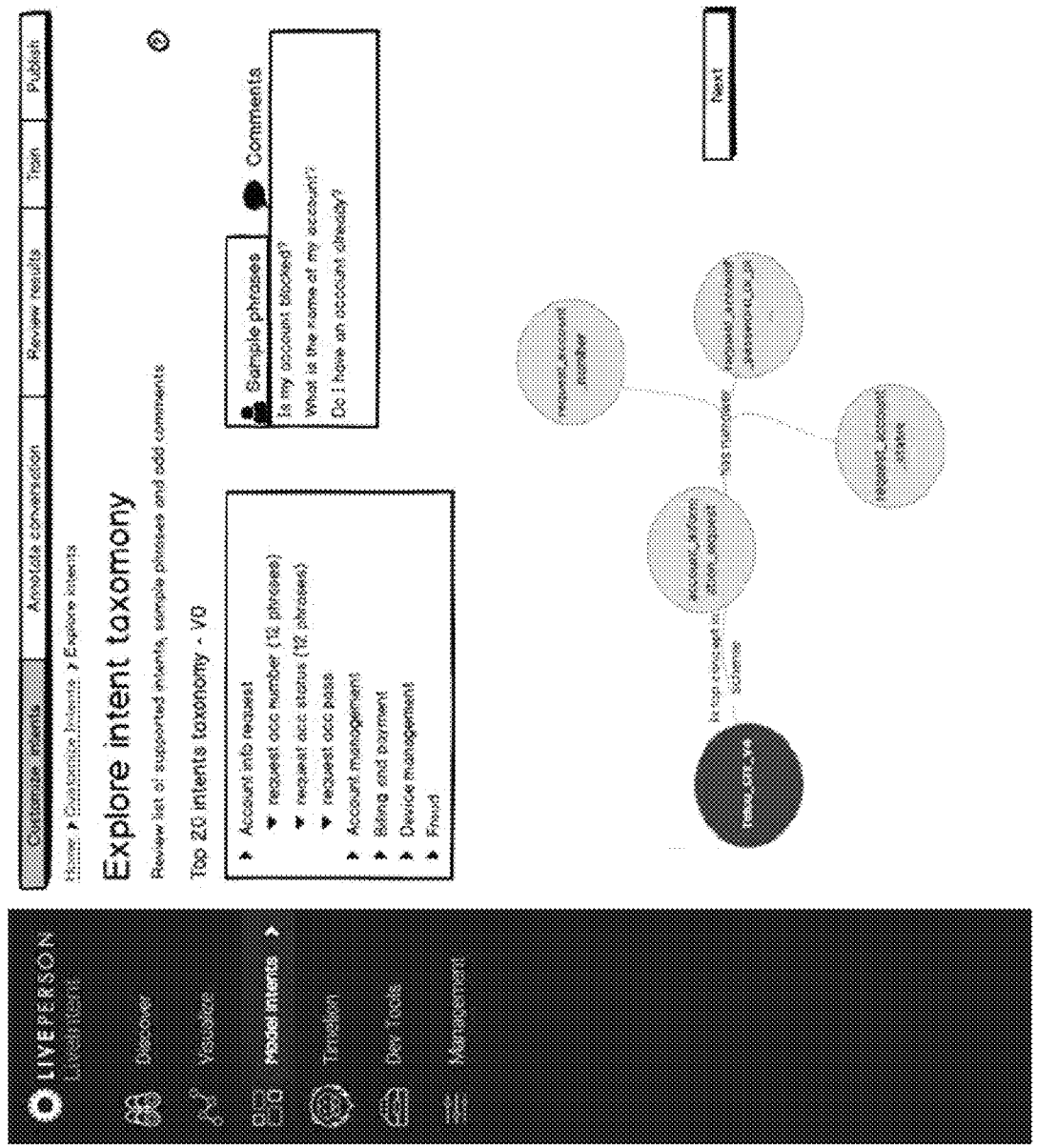

FIG. 10B is a screen shot of an interface showing a pictorial model of customized intents in an intent-driven contact center. The intent taxonomy can be explored on this interface by reviewing a list of supported intents and sample phrases that invoke those intents. In addition, this interface can be used to add comments. For example, the intent "account_info_request" may be invoked by the same phrases, "Is my account blocked?", "What is the name of my account?", and "Do I have an account already?".

Figure 10C:
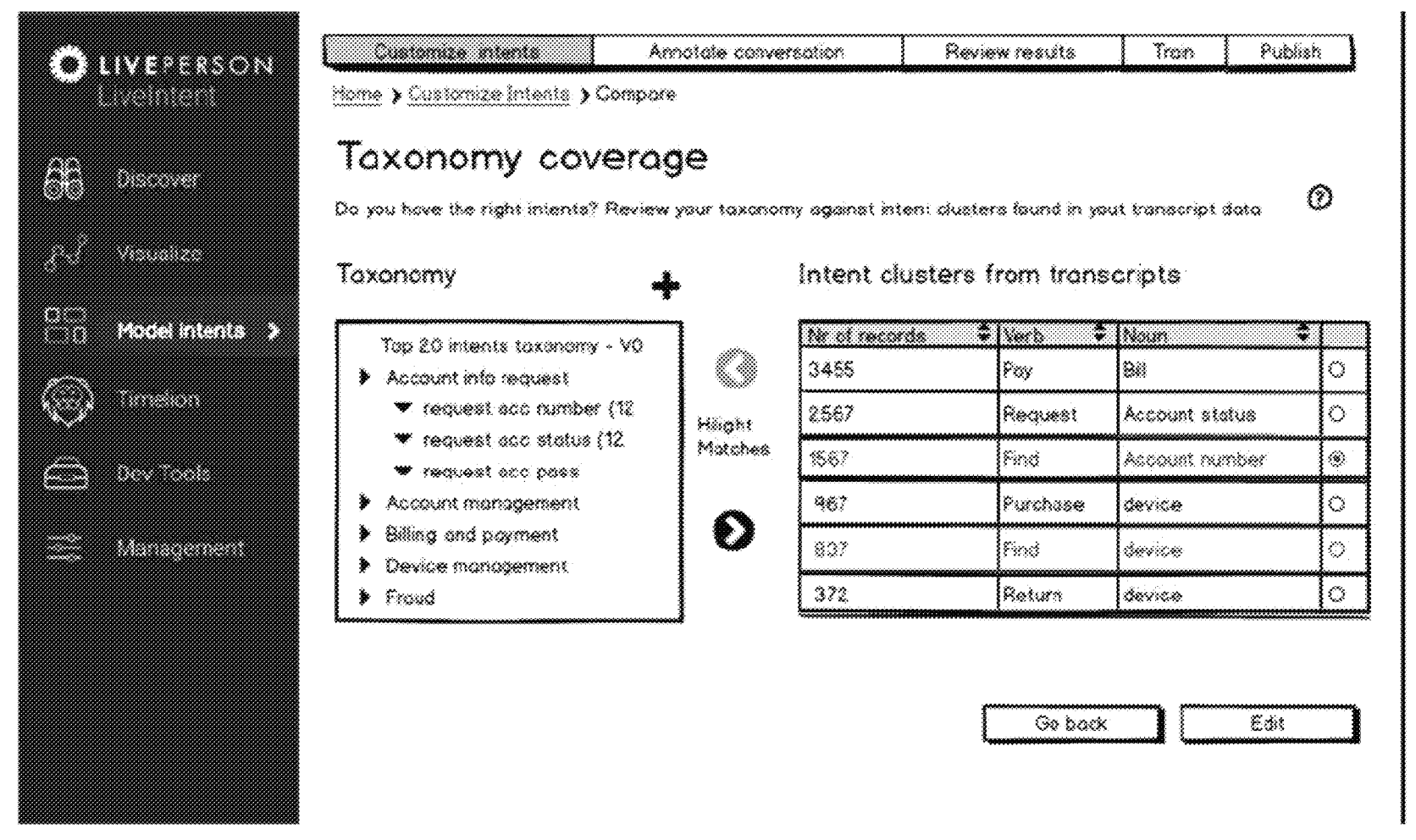

FIG. 10C is a screen shot of an interface showing taxonomy coverage modeled against intent clusters found in transcript data. For example, for the intent "account_info_request", intent clusters for "find account number" may identify 1567 associated records. Those records can be reviewed for accuracy against the identified intent.

Figure 10D:
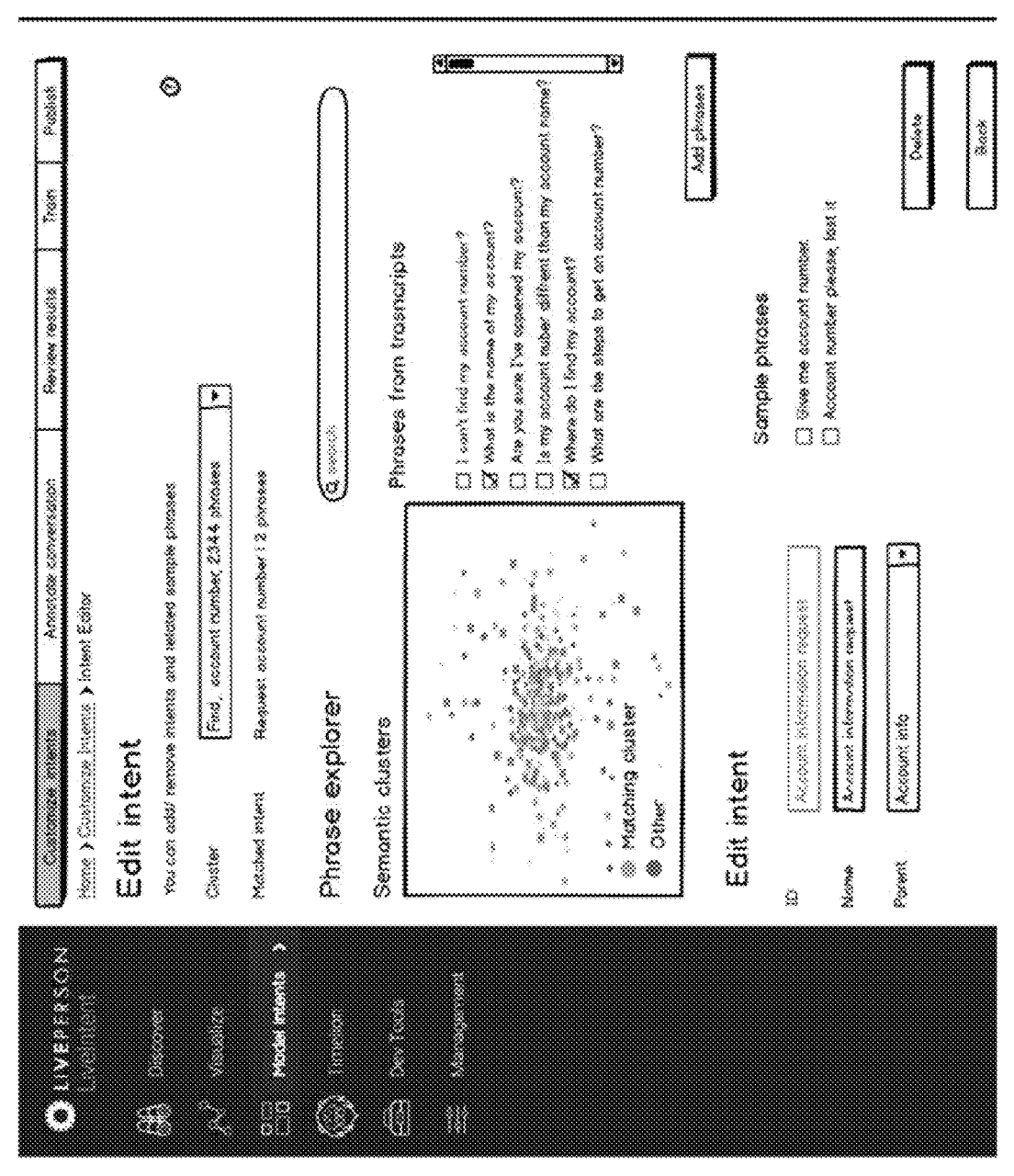

FIG. 10D is a screen shot of an interface for editing intents. On this interface, a user may add and remove intents and related sample phrases. For example, a cluster can be selected (e.g., "Find, account number, 2344 phrases"). A modeled intent can be selected (e.g., "Request account number|2 phrases"). The phrase explorer can plot semantic clusters for the matching cluster and for others. The phrases from transcripts for the modeled intent can be displayed and selected or unselected and added (e.g., "What is the name of my account?" and "Where do I find my account?").

Figure 10E:
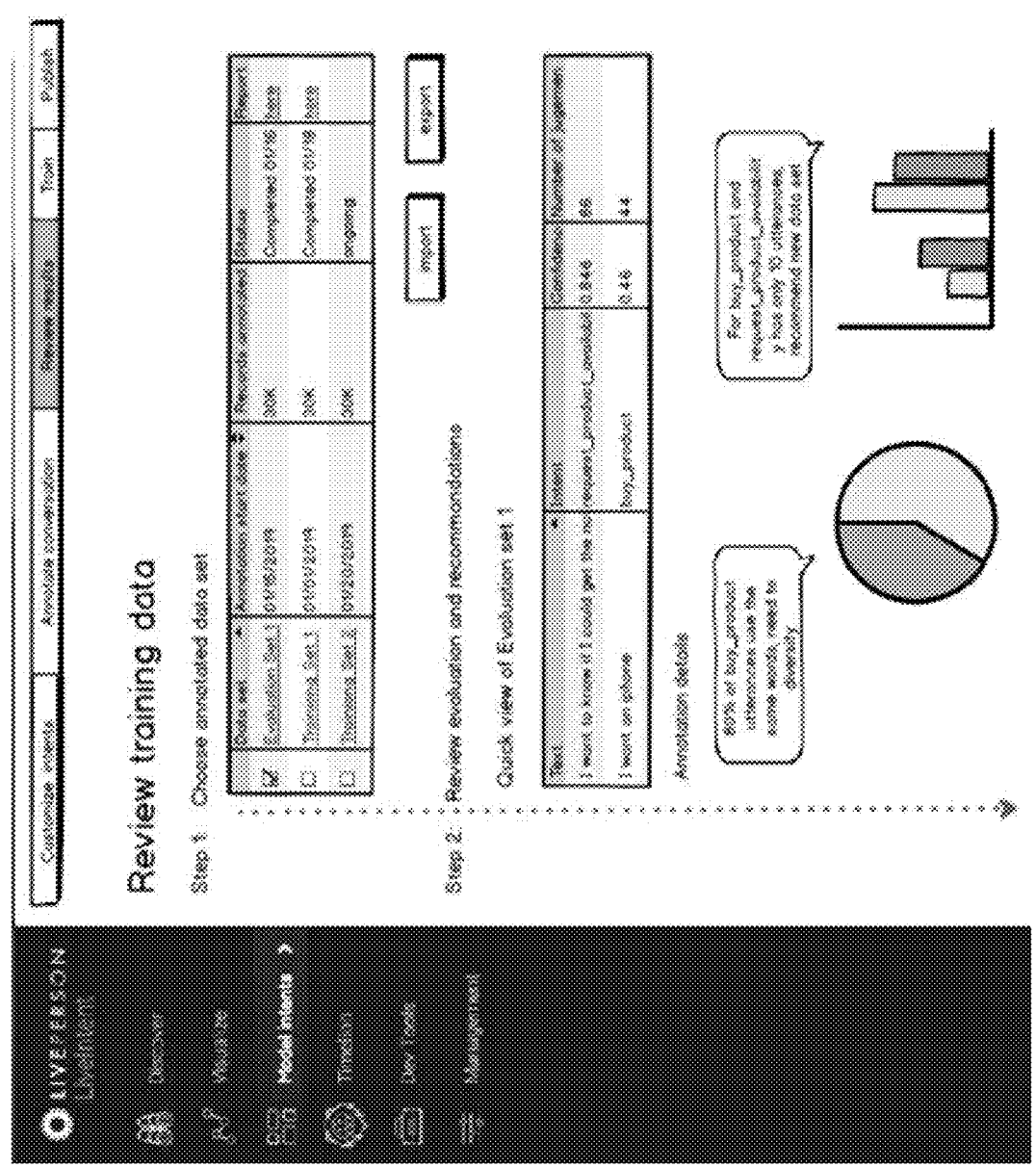

FIG. 10E is a screen shot of an interface for reviewing training data to train the intent model. At step 1, an annotated data set may be chosen. The data sets may have annotated records, statuses, and reports. At step 2, the evaluation and recommendations may be reviewed. A quick view of the communication, the identified intent, the confidence (i.e., quality of association), and the number of judgments may be displayed. Further, annotation details including recommendations for further communications to be associated with intents, for new intents, etc. may be made.

Figure 10F:
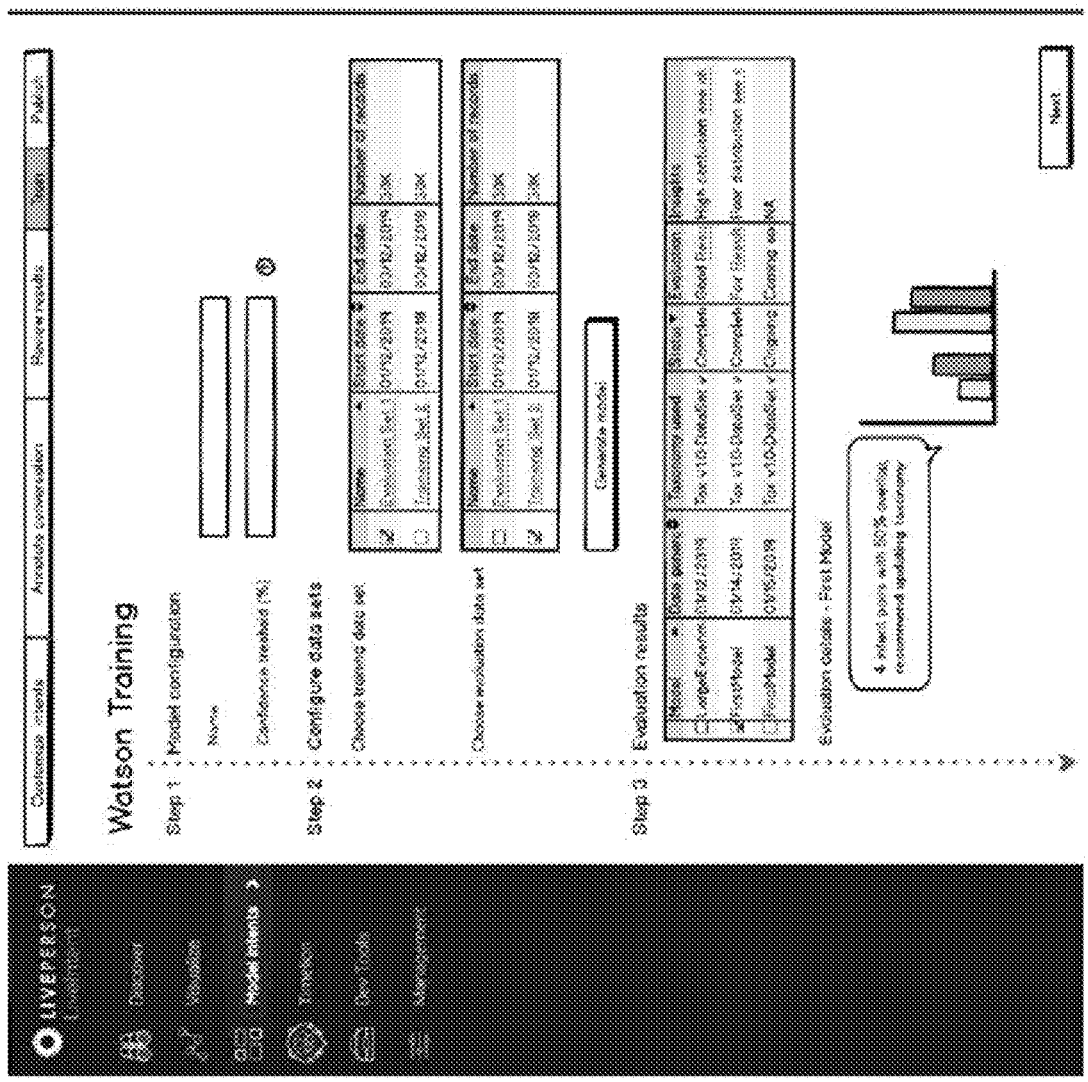

FIG. 10F is a screen shot of an interface for configuring a Watson training model of the intents. At step 1, the model can be configured according to its name and/or its confidence threshold. At step 2, the data sets can be configured. A training data set can be selected, as well as an evaluation data set. The evaluation results can be displayed, as well as insights based on the data, e.g., "High confusion", "Poor distribution", etc. Recommendations may also be made, e.g., "4 intent pairs with 50% overlap, recommend updating taxonomy".

Figure 10G:
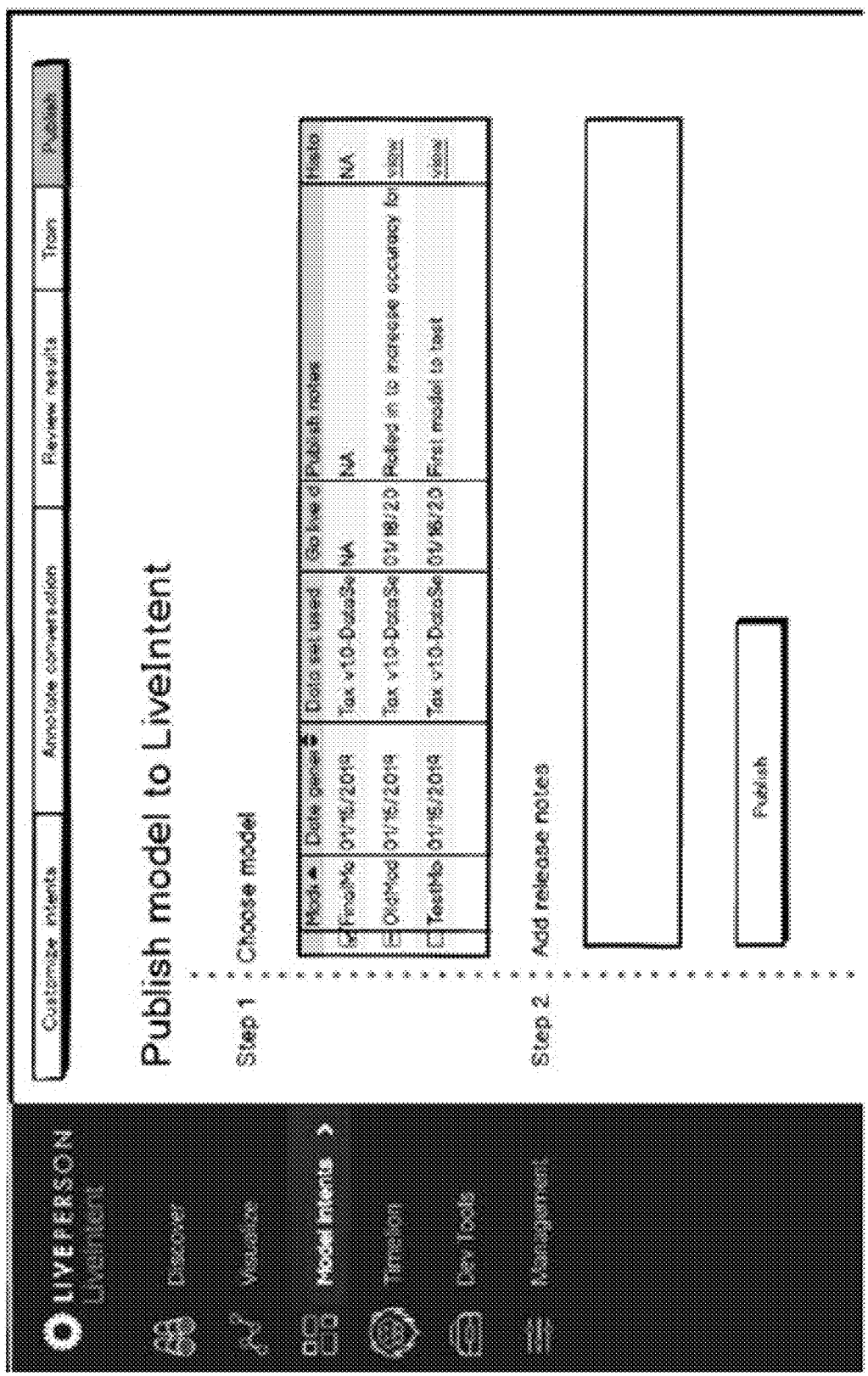

FIG. 10G is a screen shot of an interface for publishing a model. On this interface, the model can be selected and release notes can be added prior to publishing.

Figure 11A:
FIGS. 11A-11B show exemplary training interfaces for an intent-driven contact center in accordance with some aspects of the present technology.
Figure 11B:
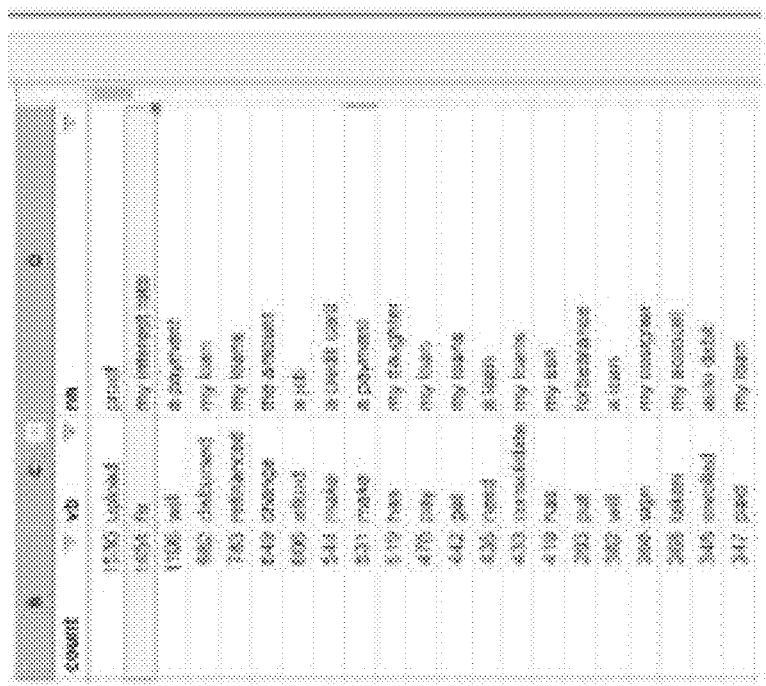

FIGS. 11A-11B show exemplary training interfaces for an intent-driven contact center in accordance with some aspects of the present technology. FIG. 11A is a screen shot of an interface for organizing different levels of data. As shown, the data is organized in folders entitled Taxonomies, Annotation, TrainingDataEval, and Models. Selection of a folder may expand the folder to display additional folders or data contained therein.

FIG. 11B is a screen shot of an interface for selecting taxonomy and displaying associated communications received for that taxonomy. For example, for the taxonomy, "fix my interest rate", the communication, "why does my interest rate keeping increasing", as well as many others, are displayed.

Figure 12:
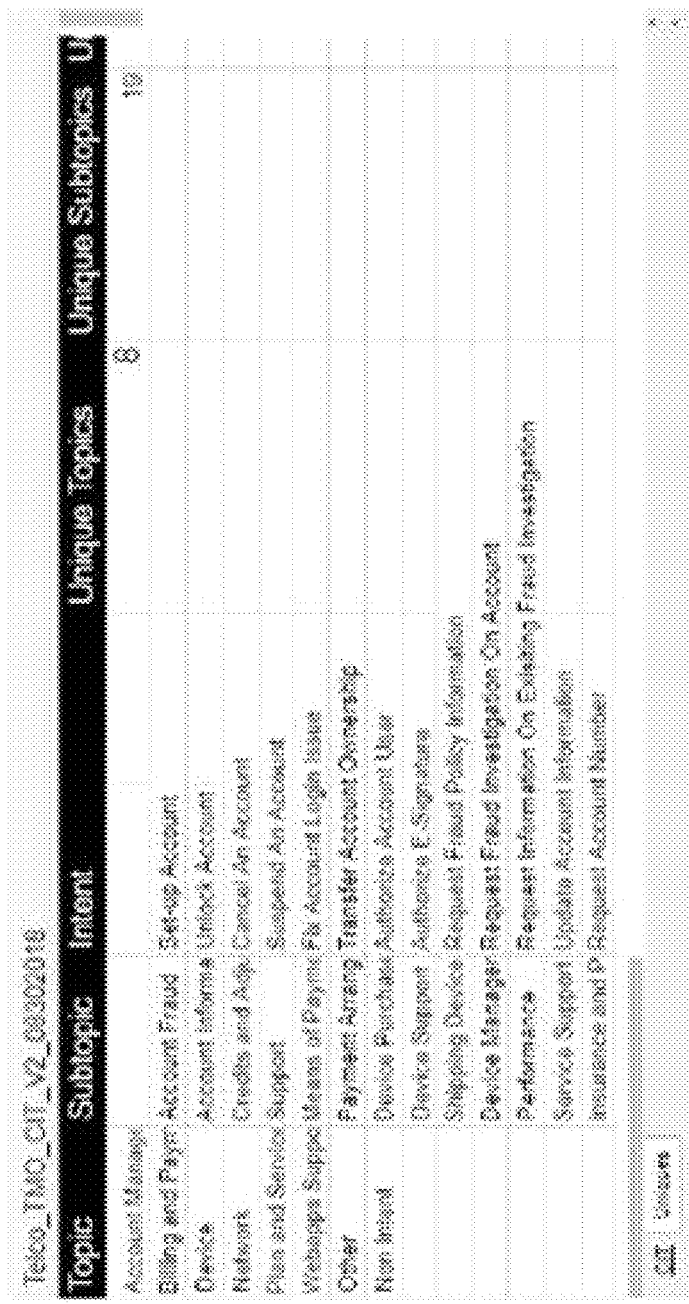
FIG. 12 shows exemplary taxonomy classification for an intent-driven contact center in accordance with some aspects of the present technology.

FIG. 12 shows exemplary taxonomy classification for an intent-driven contact center in accordance with some aspects of the present technology. FIG. 12 shows exemplary organization of topics, subtopics, and intents and how they are organized and analyzed.

Figure 13:
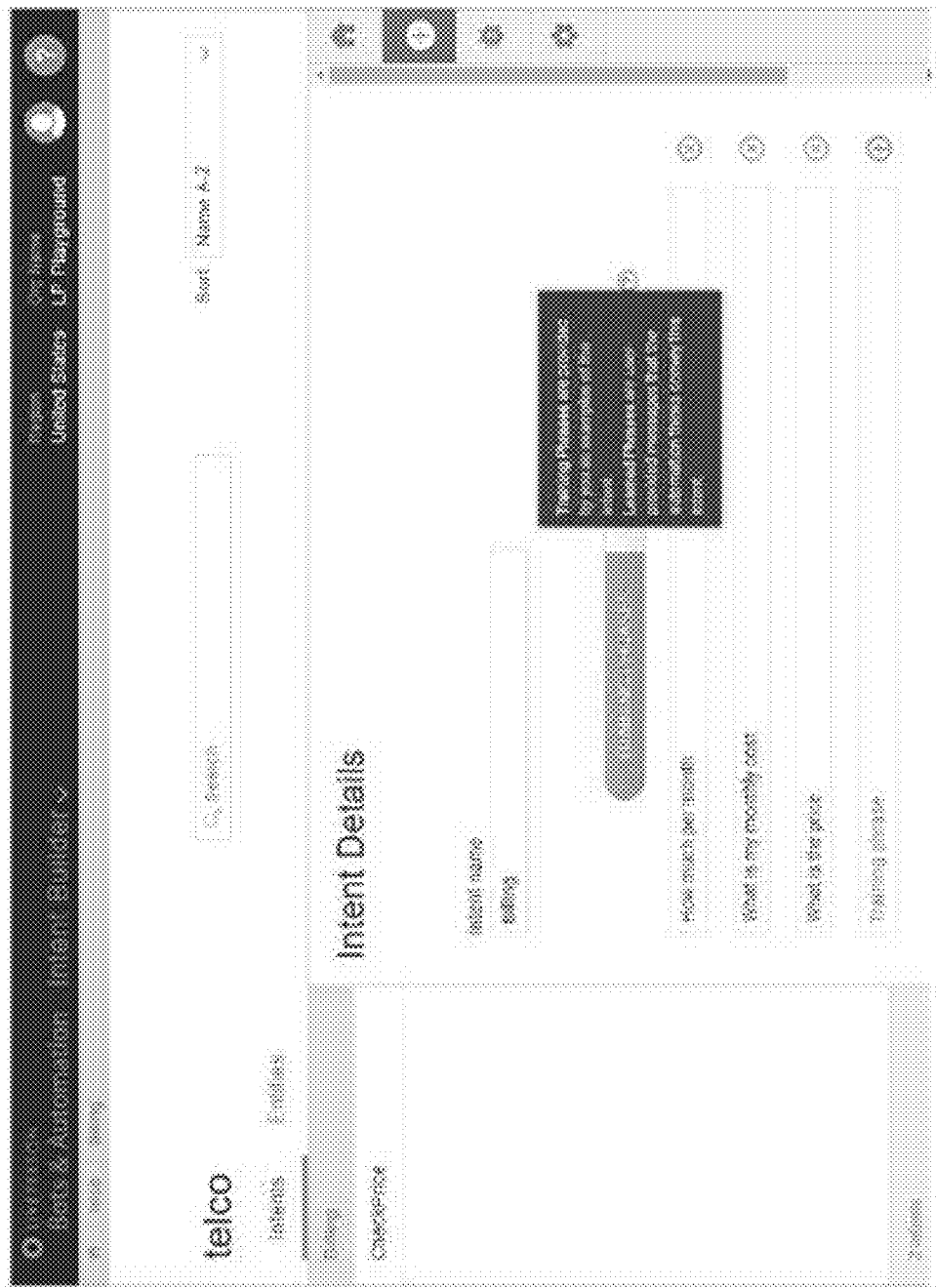
FIG. 13 shows exemplary intent phrases for an intent-driven contact center in accordance with some aspects of the present technology.

FIG. 13 shows exemplary training phrases for an intent-driven contact center in accordance with some aspects of the present technology. The screen shot shows a list of intents that can be selected to display intent details. For example, the intent "Billing" can be selected to display training phrases for that intent. Exemplary training phrases for the intent "Billing" may be "How much per month", "What is my monthly cost", and "What is the price". Additional training phrases may also be entered on this interface.

Figure 14A:
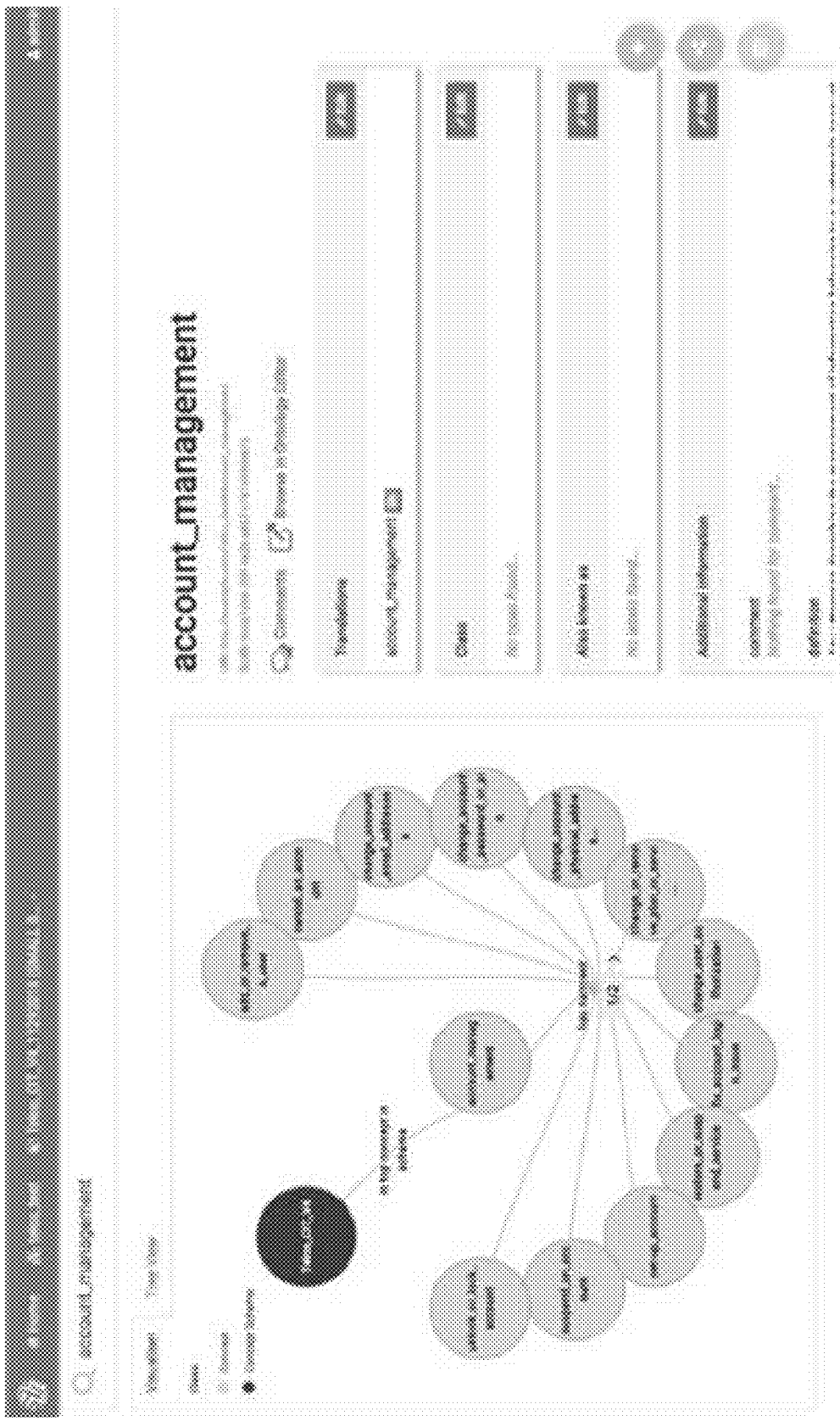
FIGS. 14A-14B shows exemplary visualized intents for an intent-driven contact center in accordance with some aspects of the present technology.
Figure 14B:
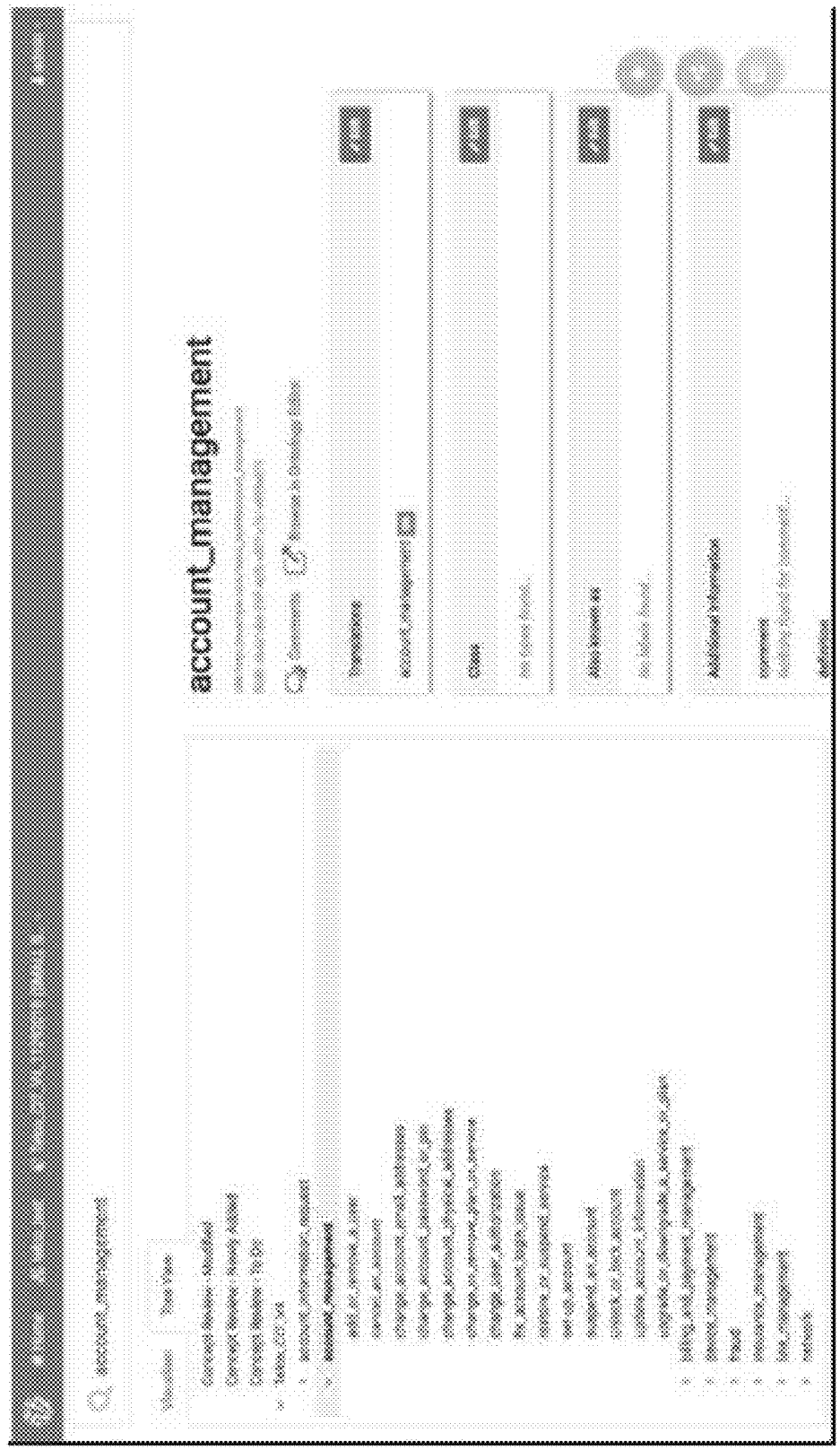

FIGS. 14A-14B shows exemplary visualized intents for an intent-driven contact center in accordance with some aspects of the present technology. FIG. 14A shows a graphical representation of the intent "account_management", as well as narrower intents related to the intent "account_management". FIG. 14B shows a textual representation of the information displayed in FIG. 14A. In FIG. 14B, the intent information is presented as a list.

Figure 15:
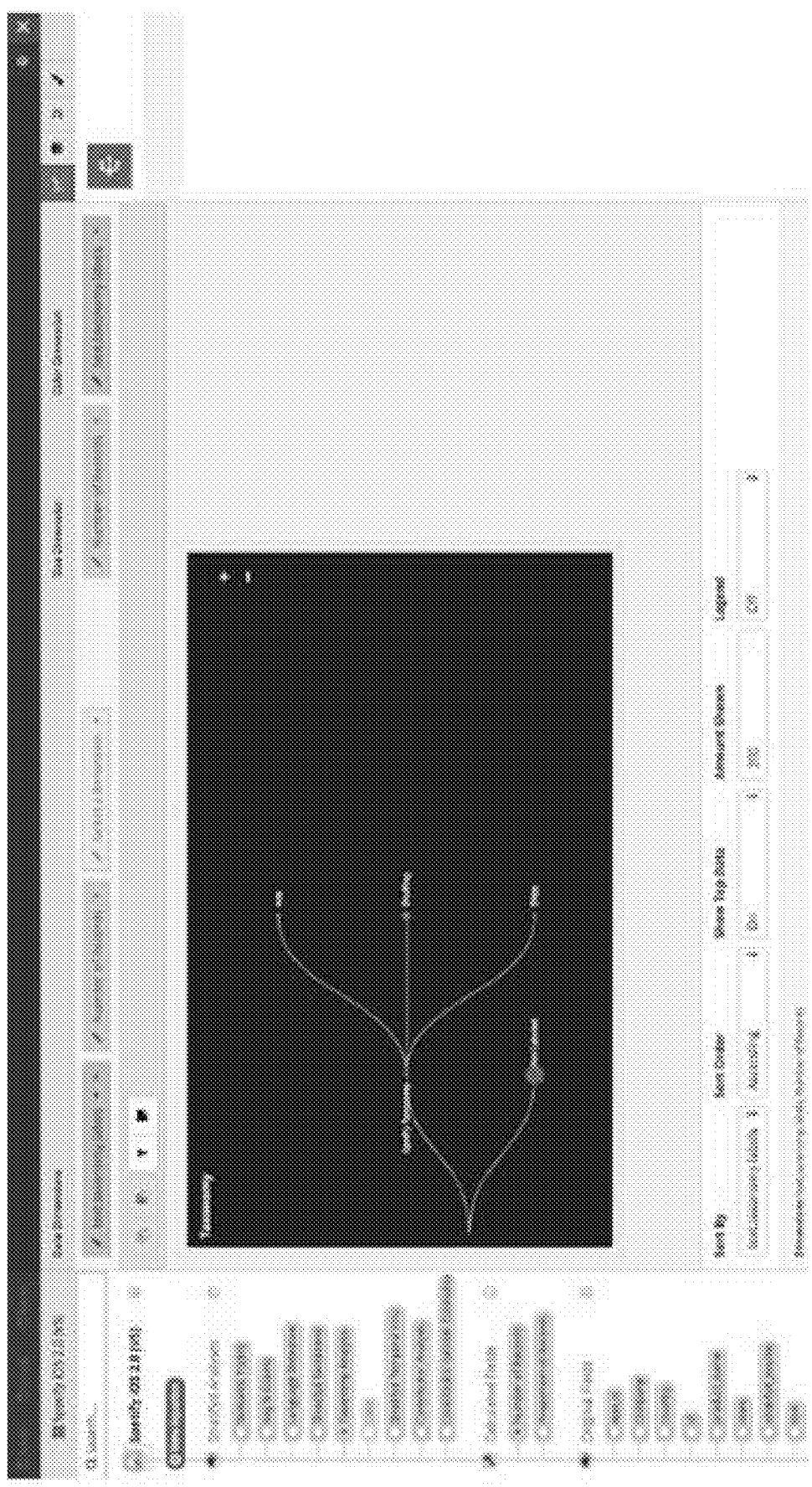
FIG. 15 shows exemplary visualized taxonomy for an intent-driven contact center in accordance with some aspects of the present technology.

FIG. 15 shows exemplary visualized taxonomy for an intent-driven contact center in accordance with some aspects of the present technology. The interface of FIG. 15 illustrates a graphical representation of taxonomy and how the taxonomy is related to each other.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data. In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

When machine-readable instructions are utilized to cause a machine to perform certain inventive steps or functions, the machine can be considered to itself be an inventive machine programmed to specifically perform those steps or functions. For example, while the machine might, without the instructions, be considered a general purpose computing device, with the instructions, the machine is considered a specialized device, explicitly configured to carry out the inventive steps of functions.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
receiving a communication, wherein the communication includes one or more words in a natural language;
parsing the communication to identify an operative word, wherein the operative word is related to an available action associated with a user device;
identifying a pre-defined intent associated with the operative word, with the pre-defined intent defines the action associated with the user device;
automatically determining a quality of an association between the communication and the pre-defined intent, wherein determining the quality of the association includes applying a formula to calculate the quality;
retrieving two or more agent profiles, wherein an agent profile corresponds to an agent associated with a terminal device;
selecting an agent profile from the two or more agent profiles, wherein the agent profile is selected based on a correlation of the agent profile to the pre-defined intent and the quality of the association between the communication and the pre-defined intent, and wherein communications are routed to a terminal device associated with the selected agent profile;
establishing a communication session between the user device and the terminal device associated with the selected agent profile; and
routing the communication, wherein when the communication is received at the terminal device associated with the agent corresponding to the selected agent profile, execution of the action is facilitated, and wherein additional communications between the user device and the terminal device are exchangeable over the communication session.

2. The computer-implemented method of claim 1, wherein identifying the operative word includes querying a database including at least the operative word, wherein the querying is performed using the one or more words as input.

3. The computer-implemented method of claim 1, wherein the pre-defined intent associated with the operative word is identified through a query of a database including associations between stored operative words and intents.

4. The computer-implemented method of claim 1, wherein the correlation of the agent profile to the pre-defined intent indicates that the pre-defined intent matches an intent of which an agent corresponding to the agent profile is knowledgeable.

5. The computer-implemented method of claim 1, wherein the pre-defined intent is generated using artificial intelligence and an intent model, wherein the artificial intelligence is applied to the intent model to aggregate intent-related data and generate corresponding intents.

6. The computer-implemented method of claim 1, wherein the correlation of the agent profile to the pre-defined intent and the quality of the association between the communication and the pre-defined intent is determined based on a score that reflects a suitability of the terminal device and an agent corresponding to the agent profile to respond to the communication.

7. The computer-implemented method of claim 1, further comprising performing a semantic analysis of the communication and an analysis of user input and communication statistics to determine the pre-defined intent.

8. The computer-implemented method of claim 1, wherein the quality of the association between the communication and the pre-defined intent is determined based on a confidence score that indicates a confidence that the communication is associated with the pre-defined intent.

9. The computer-implemented method of claim 1, wherein the quality is calculated based on a second association between the operative word and the pre-defined intent.

10. A system, comprising:
one or more processors; and
memory including instructions that, as a result of being executed by the one or more processors, cause the system to:
receive a communication, wherein the communication includes one or more words in a natural language;
identify an operative word of the one or more words from the communication, wherein the operative word is related to an available action associated with a user device;
identify a pre-defined intent associated with the operative word, wherein the pre-defined intent defines an action available to the user device;
automatically determine a quality of an association between the communication and the pre-defined intent, wherein determining the quality of the association includes applying a formula to calculate the quality;
select an agent profile from two or more agent profiles, wherein the agent profile is selected based on a correlation of the agent profile to the pre-defined intent and the quality of the association between the communication and the pre-defined intent, wherein the agent profile corresponds to an agent associated with a terminal device, and wherein communications are routed to a terminal device associated with the selected agent profile;
establish a communication session between the user device and the terminal device associated with the selected agent profile; and
route the communication, wherein when the communication is received at the terminal device associated with the agent corresponding to the selected agent profile, execution of the action is facilitated, and wherein additional communications between the user device and the terminal device are exchangeable over the communication session.

11. The system of claim 7, wherein the instructions that cause the system to identify the pre-defined intent further cause the system to perform a semantic analysis of the communication and an analysis of user input and communication statistics to determine the pre-defined intent.

12. The system of claim 10, wherein the correlation of the agent profile to the pre-defined intent and the quality of the association between the communication and the pre-defined intent is determined based on a score that reflects a suitability of the terminal device and an agent corresponding to the agent profile to respond to the communication.

13. The system of claim 10, wherein the instructions that cause the system to identify the pre-defined intent associated with the operative word further cause the system to query a database including stored associations between stored operative words and intents, to identify an association between the operative word and the pre-defined intent.

14. The system of claim 10, wherein the instructions that cause the system to automatically determine the quality of the association between the communication and the pre-defined intent further cause the system to calculate the quality based on a second association between the operative word and the pre-defined intent.

15. The system of claim 10, wherein the pre-defined intent is generated using artificial intelligence and an intent model, wherein the artificial intelligence is applied to the intent model to aggregate intent-related data and generate corresponding intents.

16. The system of claim 10, wherein the instructions that cause the system to identify the operative word of the one or more words further cause the system to query a database including at least the operative word, wherein the querying is performed using the one or more words as input.

17. The system of claim 10, wherein the correlation of the agent profile to the pre-defined intent indicates that the pre-defined intent matches an intent of which the agent corresponding to the agent profile is knowledgeable.

18. The system of claim 10, wherein the quality of the association between the communication and the pre-defined intent is determined based on a confidence score that indicates a confidence that the communication is associated with the pre-defined intent.

19. A non-transitory computer-readable storage medium storing thereon executable instructions that, as a result of being executed by one or more processors of a computer system, cause the computer system to:
identify an operative word from a communication, wherein the communication includes one or more words in a natural language and wherein the one or more words include the operative word;
identify a pre-defined intent associated with the operative word, wherein the pre-defined intent defines an action available to a user device;
automatically determine a quality of an association between the communication and the pre-defined intent, wherein determining the quality of the association includes applying a formula to calculate the quality;
select an agent profile from two or more agent profiles, wherein the agent profile is selected based on a correlation of the agent profile to the pre-defined intent and the quality of the association between the communication and the pre-defined intent, wherein the agent profile corresponds to an agent associated with a terminal device, and wherein communications are routed to a terminal device associated with the selected agent profile;
establish a communications session between the user device and the terminal device associated with the selected agent profile; and
route the communication, wherein when the communication is received at a terminal device associated with the agent corresponding to the selected agent profile, execution of the action is facilitated, and wherein additional communications between the user device and the terminal device are exchangeable over the communication session.

20. The non-transitory computer-readable storage medium of claim 19, wherein the executable instructions that cause the computer system to identify the operative word from the communication further cause the computer system to perform a query of a database including entries corresponding to stored operative words to obtain the operative word, wherein the query is performed using the one or more words as input.

21. The non-transitory computer-readable storage medium of claim 19, wherein the correlation of the agent profile to the pre-defined intent indicates that the pre-defined intent matches an intent of which the agent corresponding to the agent profile is knowledgeable.

22. The non-transitory computer-readable storage medium of claim 19, wherein the quality of the association between the communication and the pre-defined intent is determined based on a confidence score that indicates a confidence that the communication is associated with the pre-defined intent.

23. The non-transitory computer-readable storage medium of claim 19, wherein the correlation of the agent profile to the pre-defined intent and the quality of the association between the communication and the pre-defined intent is determined based on a score that reflects a suitability of the terminal device and the agent corresponding to the agent profile to respond to the communication.

24. The non-transitory computer-readable storage medium of claim 19, wherein the pre-defined intent is generated using artificial intelligence and an intent model, wherein the artificial intelligence is applied to the intent model to aggregate intent-related data and generate corresponding intents.

25. The non-transitory computer-readable storage medium of claim 19, wherein the executable instructions that cause the computer system to identify the pre-defined intent further cause the computer system to perform a query of a database including entries corresponding to associations between stored operative words and intents, to identify an association between the operative word and the pre-defined intent.

26. The non-transitory computer-readable storage medium of claim 19, wherein the executable instructions that cause the computer system to identify the pre-defined intent further cause the computer system to perform a semantic analysis of the communication and an analysis of user input and communication statistics to determine the pre-defined intent.

27. The non-transitory computer-readable storage medium of claim 19, wherein the instructions that cause the system to automatically determine the quality of the association between the communication and the pre-defined intent further cause the system to calculate the quality based on a second association between the operative word and the pre-defined intent.

* * * * *